(12) United States Patent
Tsai

(10) Patent No.: US 12,506,516 B2
(45) Date of Patent: Dec. 23, 2025

(54) PORT MAPPING BETWEEN INPUT PORTS AND OUTPUT PORTS OF RCFT DEVICES FOR UL TRANSMISSION

(71) Applicant: Mediatek Inc., Hsinchu (TW)

(72) Inventor: Lung-Sheng Tsai, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 194 days.

(21) Appl. No.: 18/205,624

(22) Filed: Jun. 5, 2023

(65) Prior Publication Data

US 2024/0007146 A1   Jan. 4, 2024

Related U.S. Application Data

(60) Provisional application No. 63/367,626, filed on Jul. 4, 2022.

(51) Int. Cl.
*H04B 7/024* (2017.01)
*H04L 27/26* (2006.01)

(52) U.S. Cl.
CPC ....... *H04B 7/024* (2013.01); *H04L 27/26025* (2021.01)

(58) Field of Classification Search
CPC .... H04B 7/024; H04B 7/0691; H04B 7/0874; H04B 7/15542; H04L 27/26025; H04L 27/2602
See application file for complete search history.

(56) References Cited

U.S. PATENT DOCUMENTS

2008/0108310 A1*  5/2008  Tong ............... H04W 74/06
                                                                     455/69

* cited by examiner

*Primary Examiner* — Fred A Casca
(74) *Attorney, Agent, or Firm* — Troutman Pepper Locke LLP; Tim Tingkang Xia, Esq.

(57) ABSTRACT

A wireless device has $M_R$ RX antennas and $M_T$ TX antennas. The wireless device divides the $M_R$ RX antennas into two or more RX antenna groups for receiving signals from a UE on a first carrier frequency. The wireless device receives first signals carried on the first carrier frequency at each RX antenna group during a part of or all of a set of first transmission time intervals of a SCS. The first transmission time intervals correspond to a second transmission time interval of a second SCS. The wireless device combines the first signals received by each RX antenna group during the set of first transmission time intervals linearly based on predetermined coefficients. The wireless device maps the combined first signals to second signals carried on a second carrier frequency. The wireless device transmits the second signals carried on the second carrier frequency.

20 Claims, 20 Drawing Sheets

PORT MAPPING BETWEEN INPUT PORTS AND OUTPUT PORTS OF RCFT DEVICES FOR UL TRANSMISSION

CROSS-REFERENCE TO RELATED APPLICATION(S)

This application claims the benefits of U.S. Provisional Application Ser. No. 63/367,626, entitled "PORT MAPPING BETWEEN INPUT PORTS AND OUTPUT PORTS OF RCFT DEVICES FOR UL TRANSMISSION" and filed on Jul. 4, 2022. The content of the application above is expressly incorporated by reference herein in its entirety.

BACKGROUND

Field

The present disclosure relates generally to communication systems, and more particularly, to techniques of forming distributed MIMO receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a wireless device are provided. The wireless device has $M_R$ reception (RX) antennas and $M_T$ transmission (TX) antennas. The wireless device divides the $M_R$ RX antennas into two or more RX antenna groups for receiving signals from a user equipment (UE) on a first carrier frequency. The number of transmission antennas of the UE is $N_T$, and the number of reception antennas in each RX antenna group is greater than or equal to $N_T$. The wireless device receives first signals carried on the first carrier frequency at each RX antenna group during a part of or all of a set of first transmission time intervals of a first subcarrier spacing (SCS). The first transmission time intervals correspond to a second transmission time interval of a second SCS. The wireless device combines the first signals received by each RX antenna group during the set of first transmission time intervals linearly based on predetermined coefficients. The wireless device maps the combined first signals to second signals carried on a second carrier frequency. The wireless device transmits the second signals carried on the second carrier frequency to a base station in the second transmission time interval at a respective transmission antenna group selected from the $M_T$ TX antennas and corresponding to each RX antenna group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
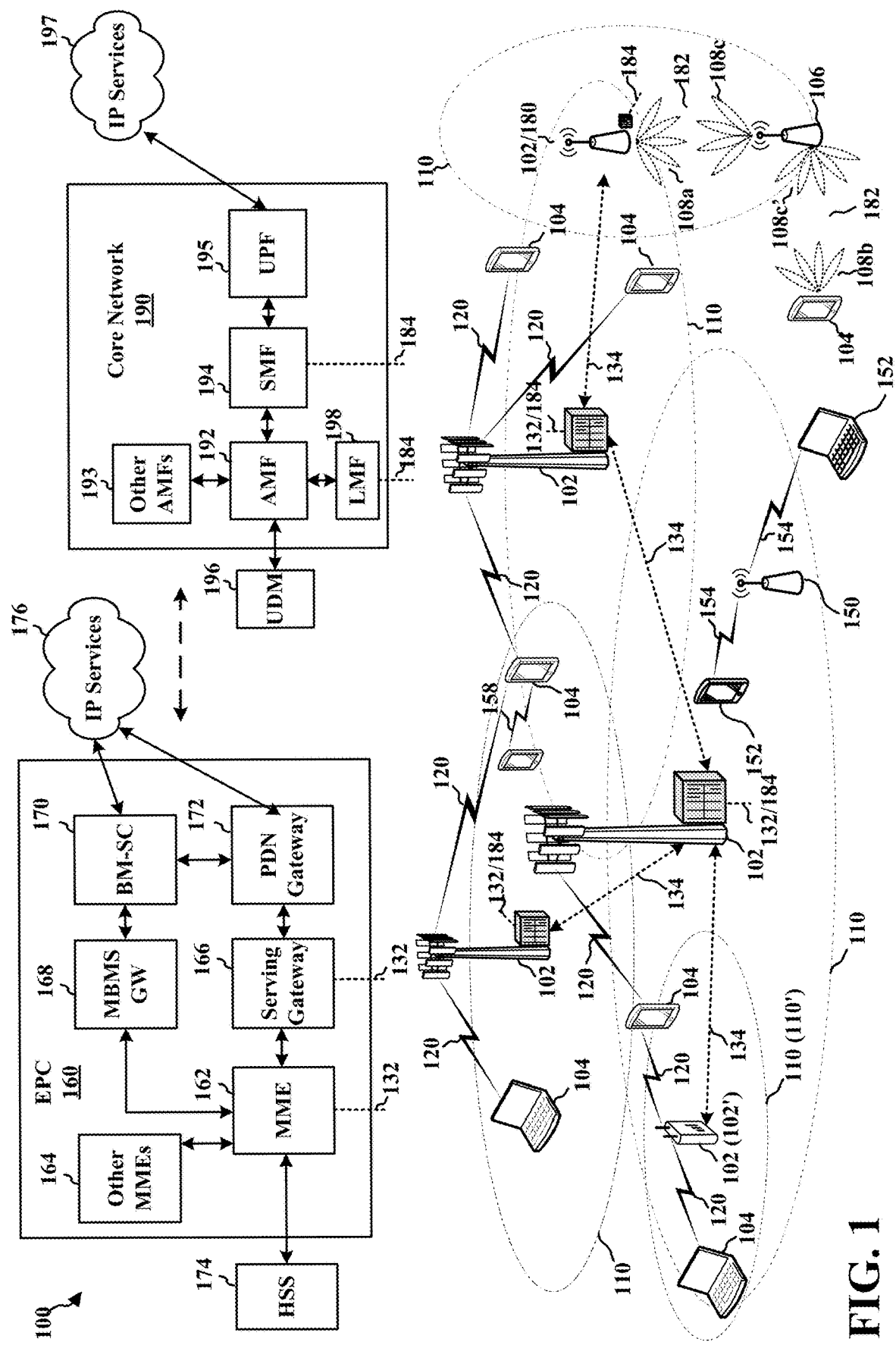
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
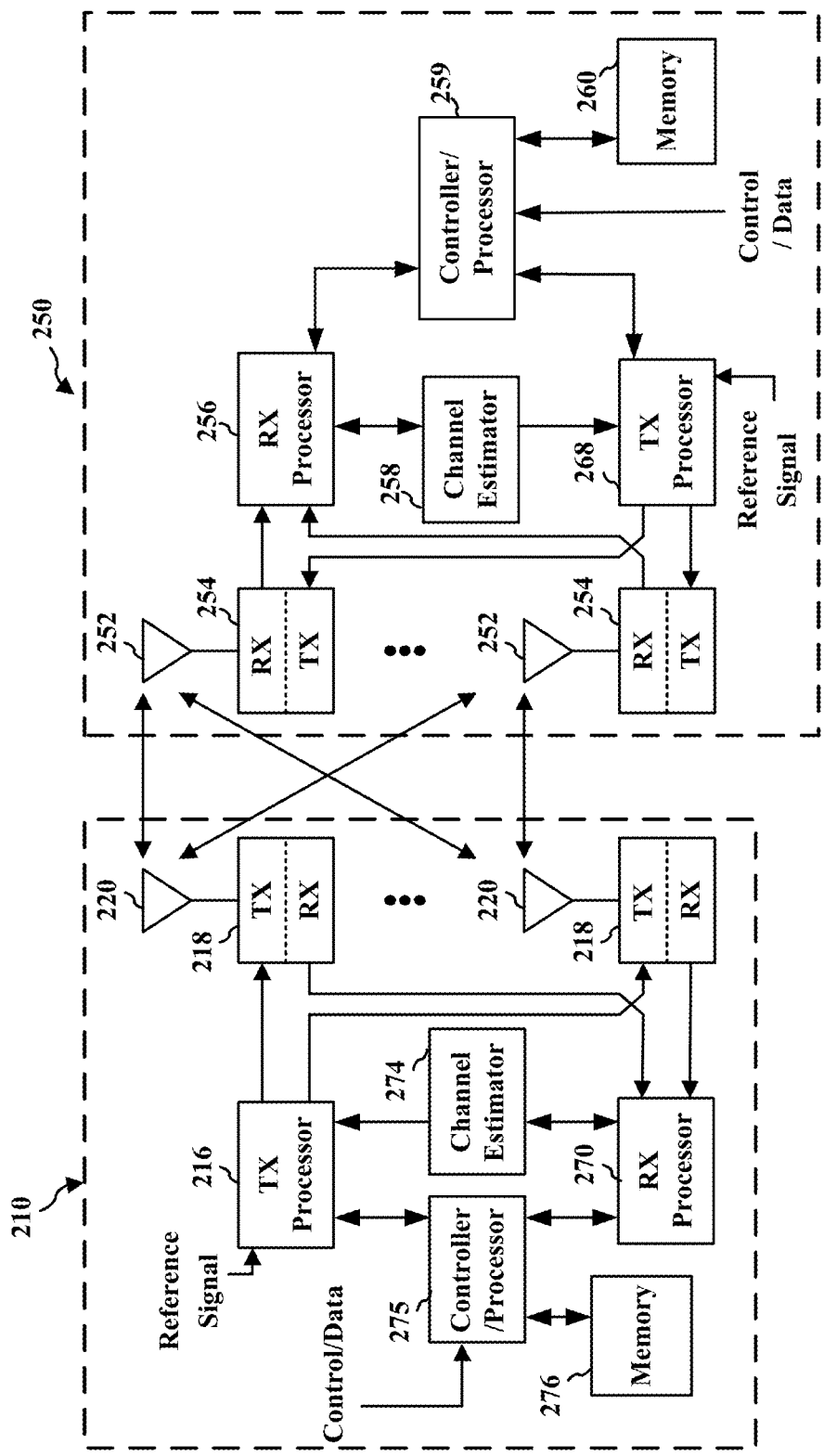
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
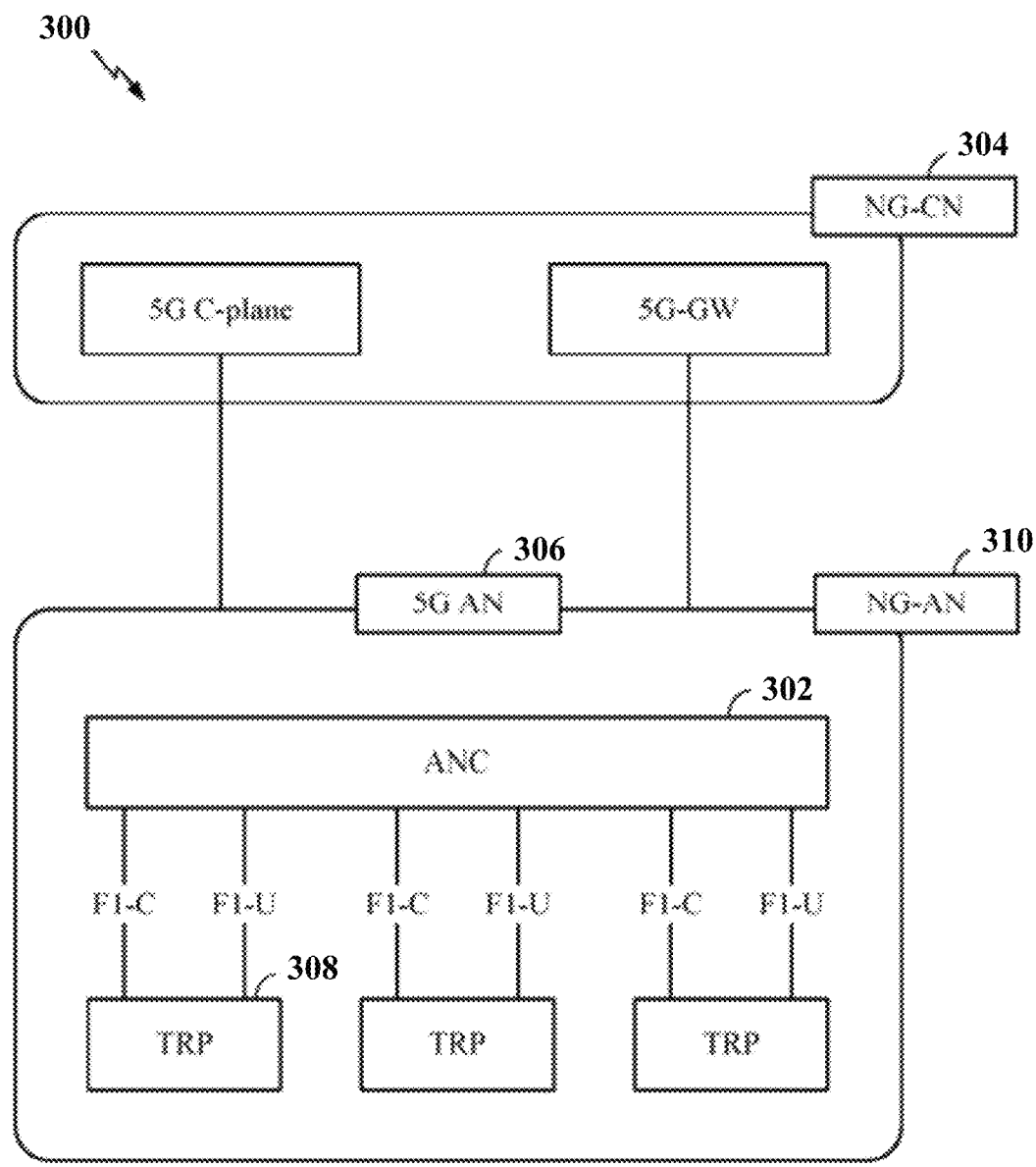
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
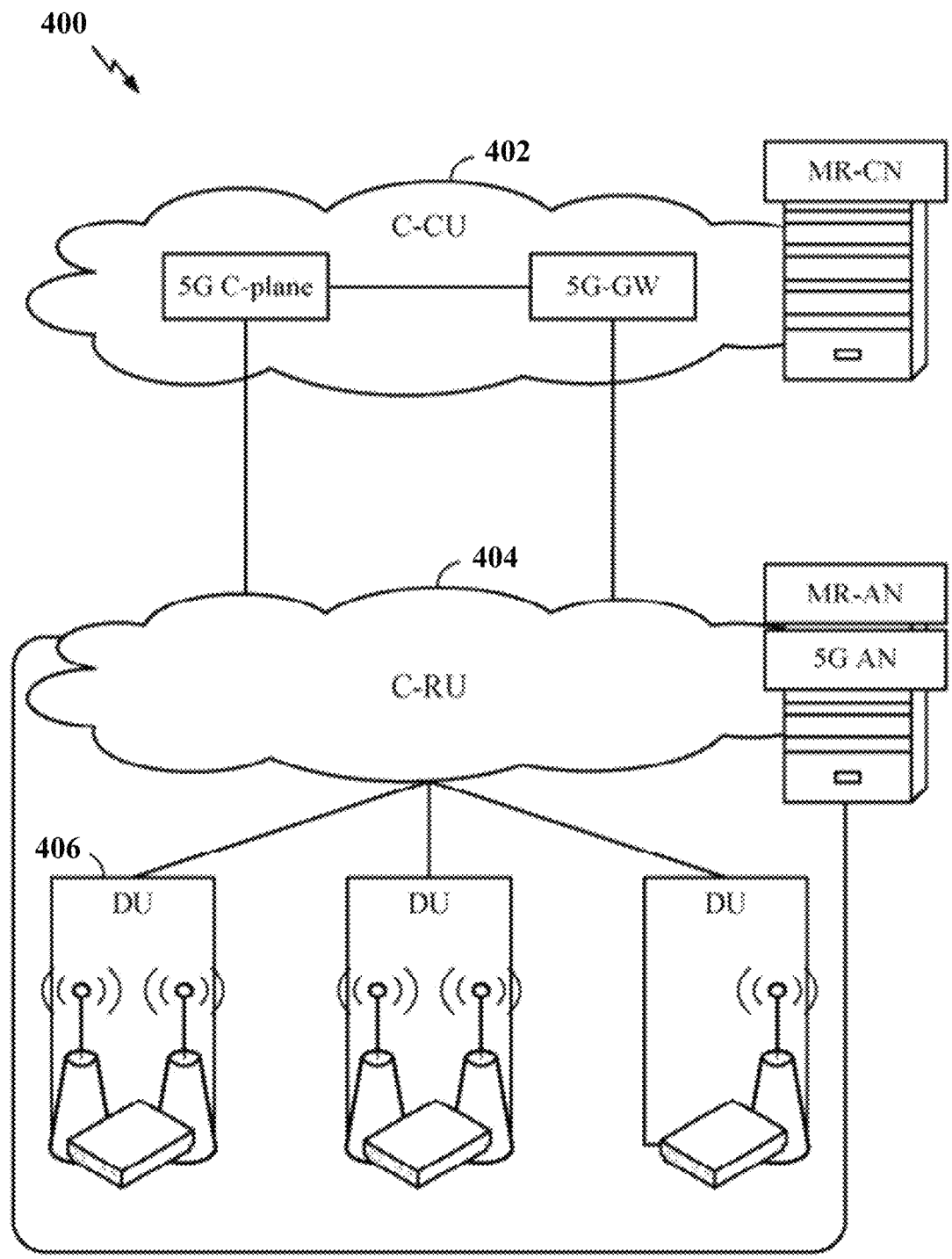
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
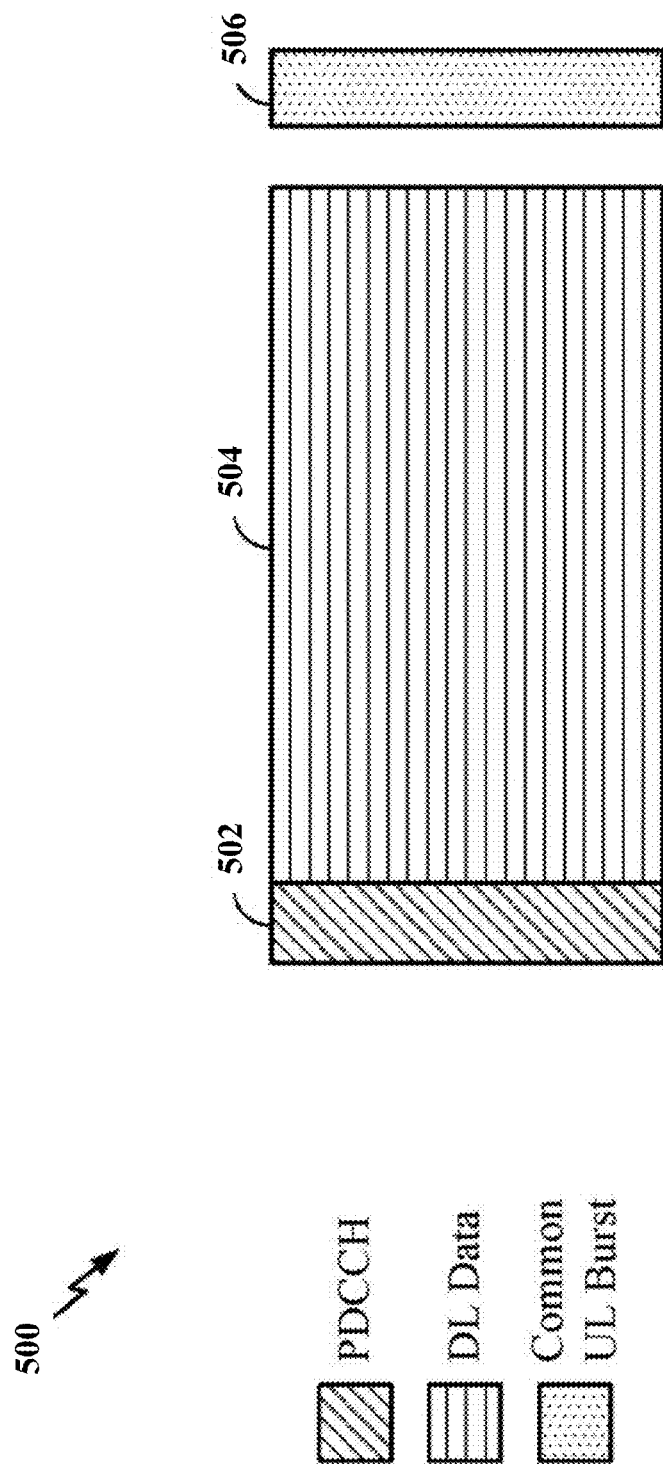
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
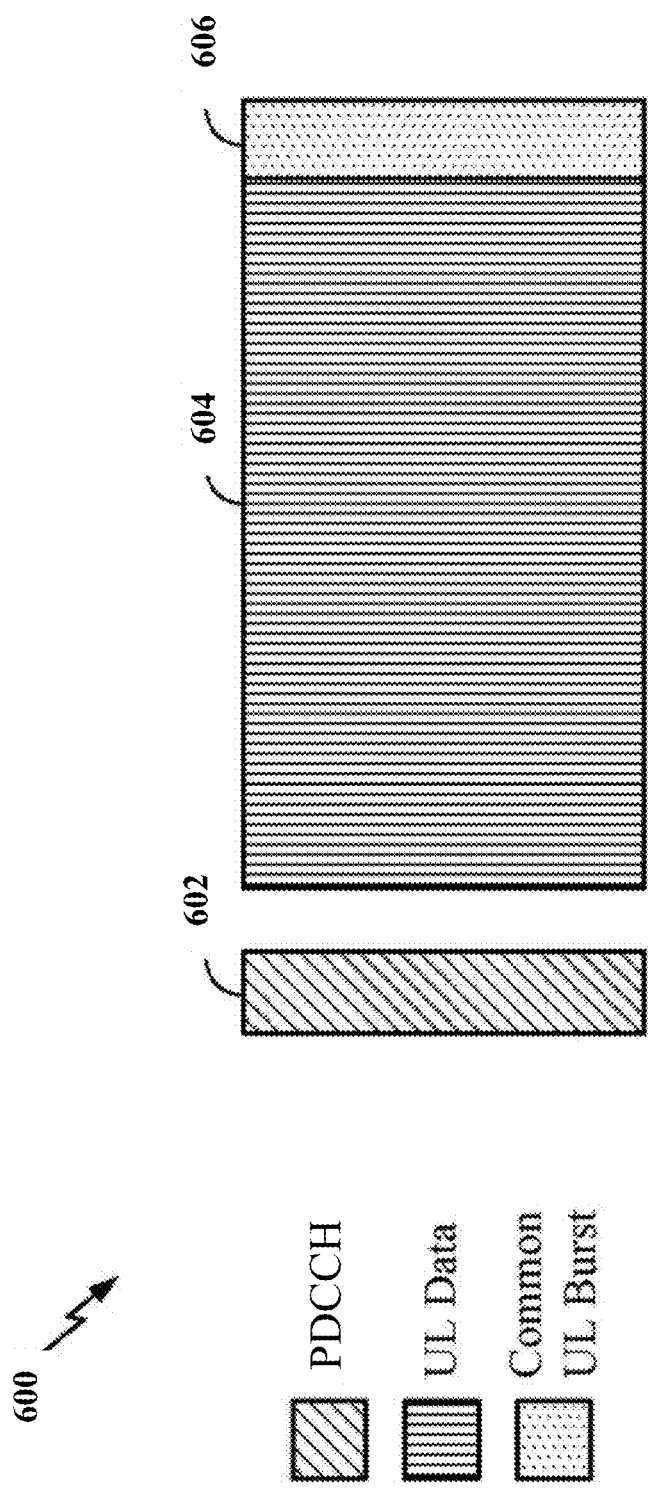
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UET) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
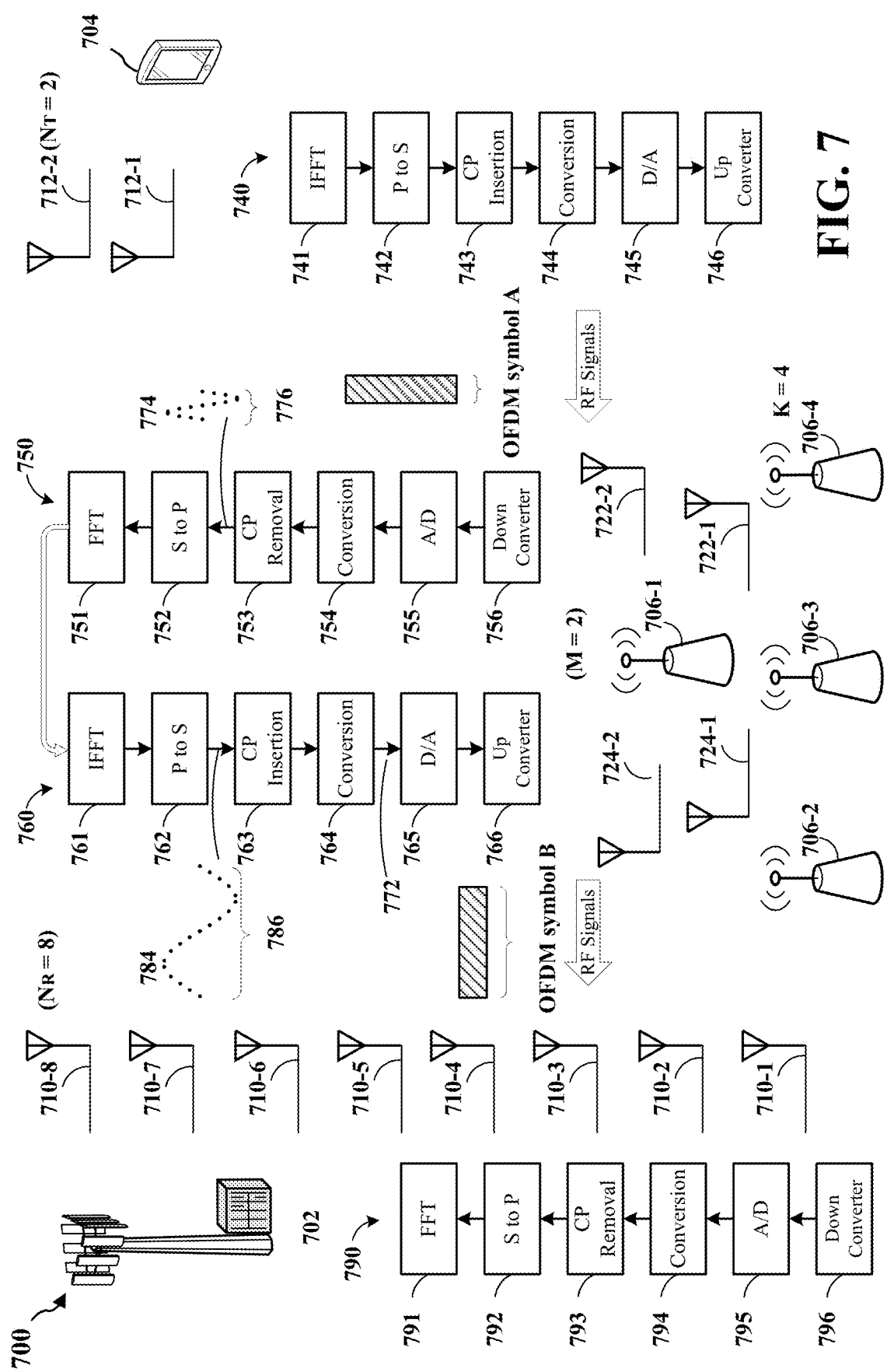
FIG. 7 is a diagram illustrating uplink MIMO transmission from a UE to a base station via one or more repeaters.

FIG. 7 is a diagram 700 illustrating uplink MIMO transmission from a UE to a base station via one or more repeaters. In this example, a UE 704 has 2 transmission antennas 712-1, 712-2 and a base station 702 has 8 antennas 710-1, 710-2, . . . 710-8. Further, repeaters 706-1 . . . 706-K are placed between the base station 702 and the UE 704. In this example, K is 4. Each of the repeaters 706-1 . . . 706-K has two reception antennas 722-1, 722-2 and two transmission antennas 724-1, 724-2. In certain configurations, the same antenna may function as a reception antenna and a transmission antenna.

The UE 704 utilizes a respective transmission chain 740 to generate RF signals to be transmitted at transmission antennas 712-1, 712-2. Each transmission chain 740 includes an IFFT component 741, a parallel to serial component 742, a CP insertion component 743, a conversion component 744 that includes a rate converter and/or filter(s), a digital-to-analog converter 745, and an up converter 746.

Figure 8:
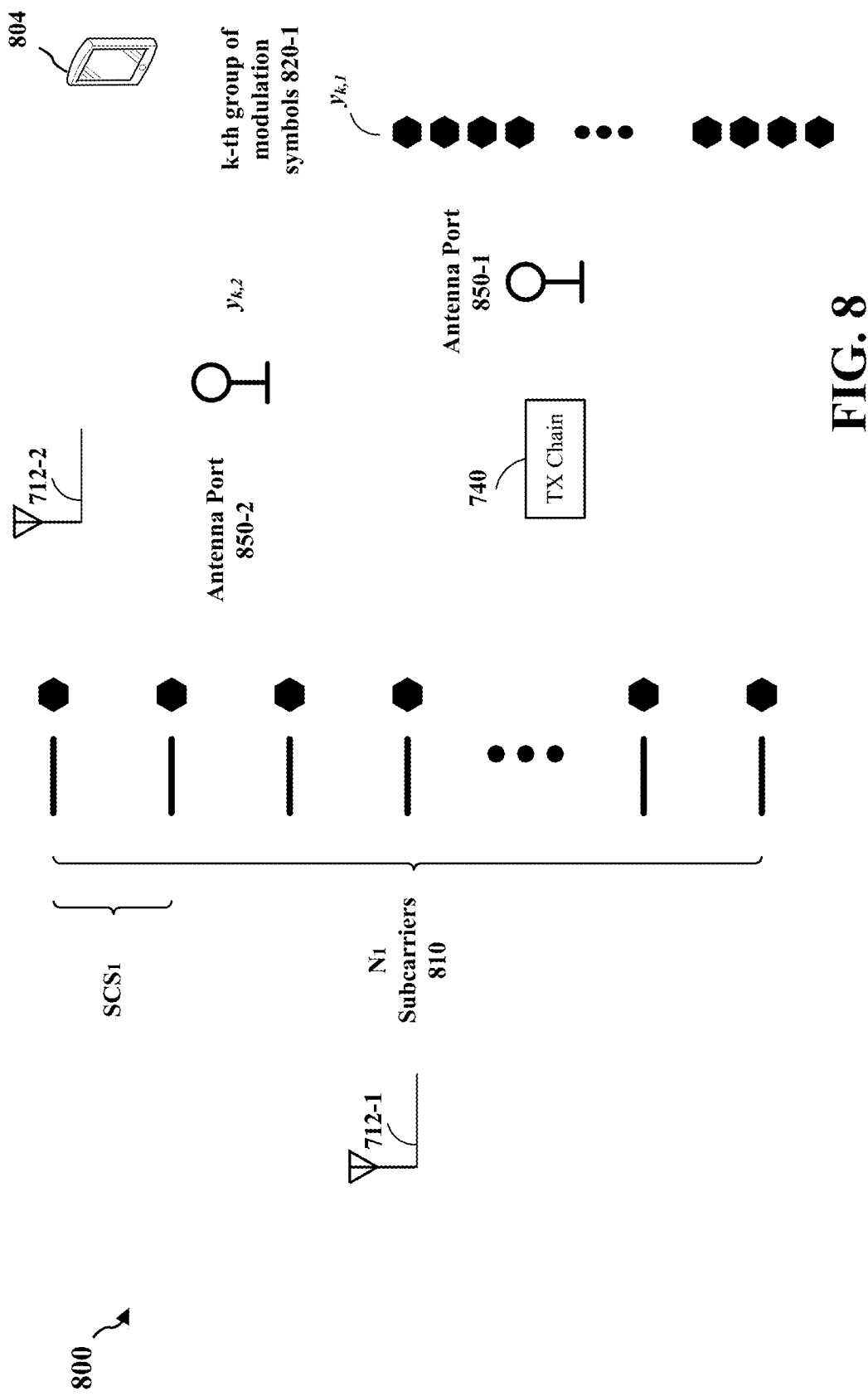
FIG. 8 is a diagram illustrating RF signal generation at a UE.

FIG. 8 is a diagram 800 illustrating RF signal generation at a UE. In this example, the UE 704 may be configured with 2 antenna ports 850-1, 850-2 to each of which one or more of the antennas 712-1, 712-2 are assigned. In particular, each of the antenna ports 850-1, 850-2 may be associated with more than one physical antenna. In such a case, each of the antenna port may be referred to as a beamformed antenna port.

Further, each transmission chain 740 may use $N_1$ subcarriers 810 (e.g., 4096 subcarriers) having a $SCS_1$ (e.g., 120 kHz). The transmission chain 740 of the transmission antenna 712-$i$ receives, from an $i^{th}$ antenna port, a $k^{th}$ group of $N_1$ modulation symbols 820-$i$, denoted as $y_{k,i}$, and generates corresponding RF signals to be transmitted through the transmission antenna 712-$i$ in an OFDM symbol A, which corresponds to $SCS_1$. k is the group index of the modulation symbols and i is the index of the antenna port.

Using the transmission antenna 712-1 as an example, that antenna is assigned to the antenna port 850-1. A $k^{th}$ group of $N_1$ modulation symbols 820-1 from the antenna port 850-1, $y_{k,1}$, are to be transmitted in one OFDM symbol A through the transmission chain 740. The UE 704 applies $y_{k,1}$ to the $N_1$ subcarriers 810 in a corresponding time period.

Referring back to FIG. 7, the $N_1$ subcarriers 810 carrying the $N_1$ modulation symbols 820-1 are sent to the IFFT component 741 with $N_1$ inputs. The $N_1$ time domain signals output from the IFFT component 741 are treated as a time sequence and sent to the parallel to serial component 742 to form a combined time domain signal. The CP insertion component 743 receives the combined time domain signal and adds a cyclic prefix, resulting a time domain signal spanning an OFDM symbol. The cyclic prefix may eliminate inter-symbol interference between two adjacent OFDM symbols. The resulting time domain signal is in digital form, and processed through the conversion component 744 to achieve a desired sample rate. The converted time domain signal in digital form is sent to the digital-to-analog converter 745, which accordingly generates an analog time domain signal. Subsequently, the up converter 746 receives the analog time domain signal and mixes the analog time domain signal with a first carrier frequency ($f_1$) to generate a RF signal. The RF signal is transmitted through the antenna 712-1 of the UE 704. In particular, the first carrier frequency of the RF signals transmitted from the UE 704 may be in FR2.

Similarly, the antenna ports 850-2 receives modulation symbols. A transmission chain 740 assigned to the antenna ports 850-2 accordingly generates corresponding RF signals, which are transmitted through an antenna assigned to the antenna ports 850-2. As such, in this example, $y_{k,1}$ and $y_{k,2}$ are transmitted through the transmission antennas 712-1 and 712-2.

Figure 9:
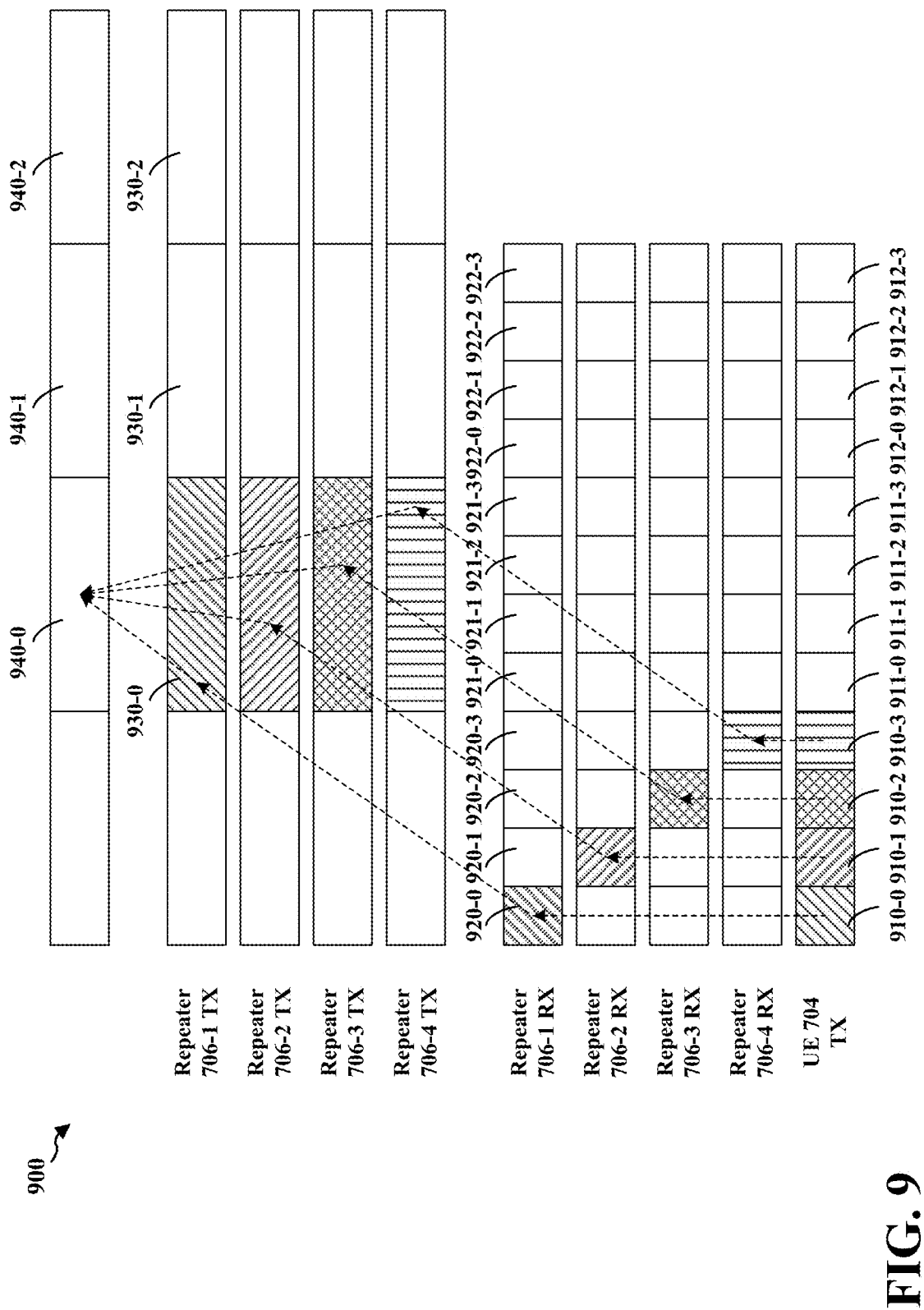
FIG. 9 is a diagram illustrating uplink transmission timing from a UE to a base station via one or more repeaters.

FIG. 9 is a diagram 900 illustrating uplink transmission timing from a UE to a base station via one or more repeaters. The UE 704 transmits, through the transmission antennas 712-1 and 712-2, RF signals on a first carrier frequency in slots 910-0, . . . , 910-$q$, slots 911-0, . . . , 911-$q$, and slots 912-0, . . . , 912-$q$, etc. The slots 910-0, . . . , 910-$q$, etc. are corresponding to a first subcarrier spacing ($SCS_1$, e.g., 120 kHz).

As described infra, the slots 920-0, . . . , 920-$q$, slots 921-0, . . . , 921-$q$, and slots 922-0, . . . , 922-$q$, etc. are corresponding to the first subcarrier spacing ($SCS_1$). The repeaters 706-1 . . . 706-K receive the RF signals of the first carrier frequency in the slots 920-0, . . . , 920-$q$, slots 921-0, . . . , 921-$q$, and slots 922-0, . . . , 922-$q$, etc. The repeaters 706-1 . . . 706-K transform a first set of baseband signals carried on the RF signals of the first carrier frequency to obtain a second set of baseband signals, and transmit the second set of baseband signals over RF signals of a second carrier frequency in slots 930-0, 930-1, 930-2, etc. As described infra, the slots 930-0, 930-1, 930-2, etc. are corresponding to a second subcarrier spacing ($SCS_2$, e.g., 30 kHz). The base station 702 receives the RF signals of the second carrier frequency in slots 940-0, 940-1, 940-2, etc. The slots 940-0, 940-1, 940-2, etc. are corresponding to the second subcarrier spacing ($SCS_2$). In this example, q is 3. In NR, a slot may be an interval occupied by 14 OFDM symbols. The repeaters receive signal at the first frequency in the high frequency band, which may not be able to be used for direct transmission to the base station due to limited coverage. After repeater operations, the signal is forwarded by the repeaters at the second frequency in the low frequency band, which provides much wider coverage for the base station. As a result, the un-used/out-of-coverage bandwidth in the high frequency band can be traded for additional spatial multiplexing gain in the low frequency band.

The time duration of each of the slots 920-0, . . . , 920-$q$, etc. is $TTI_1$. The time duration of each of the slots 930-0, 930-1, 930-2, etc. is $TTI_2$. Denote $L=SCS_1/SCS_2=TTI_2/TTI_1$. Denote the first carrier frequency as $f_1$, and the second carrier frequency as $f_2$.

The UE 704 transmits the RF signals on $f_1$ to the $k^{th}$ repeater at $t_0 \times TTI_2+(k-1) \times TTI_1$ (k=1, . . . , K) (e.g., slots 910-0, . . . , 910-$q$), $t_0$ is the time index defined according to $TTI_2$. In this example, the UE 704 transmits the RF signals to the repeater 706-1 in slot 910-0, to the repeater 706-2 in slot 910-1, to the repeater 706-3 in slot 910-2 and to the repeater 706-4 in slot 910-3.

Each of the repeaters 706-1 . . . 706-K receives and transmits respective RF signals of $f_1$ as described infra. The $k^{th}$ repeater receives its RF signals of $f_1$ in $t_0 \times TTI_2+(k-1) \times TTI_1$ (k=1, . . . , K) and transmits the RF signals of $f_2$ in $(t_0+offset) \times TTI_2$. The offset (e.g., 1) is set to provide sufficient time for signal receiving and processing at a repeater. The number of repeaters 706-1 . . . 706-K (i.e., K) is at most L where is $SCS_1/SCS_2=TTI_2/TTI_1$, to utilize the full timing resource for transmission. In this example, the repeater 706-1 receives the RF signals in slots 920-0 and waits 3 slots (i.e., 920-1, 920-2, 920-3), the repeater 706-2 receives the RF signals in slots 920-1 and waits 2 slots (i.e., 920-2, 920-3), the repeater 706-3 receives the RF signals in slots 920-2 and waits 1 slot (i.e., 920-3), the repeater 706-4 receives the RF signals in slots 920-3. The repeaters 706-1, 706-2, 706-3 and 706-4 transmit their own RF signals to the base station 702 simultaneously in the next $TTI_2$ slot 930-0.

Referring back to FIG. 7, as described supra, there are K repeaters 706-1 . . . 706-K placed between the base station 702 and the UE 704. In general, a repeater has $M_r$ reception antennas and $M_t$ transmission antennas. In this example, for ease of presentation, $M_t=M_r=M$. A single physical antenna may function as both a reception antenna and a transmission antenna. More specifically, M is 2. Each of the repeaters 706-1 . . . 706-K has reception antennas 722-1, 722-2 and transmission antennas 724-1, 724-2.

Each of the repeaters 706-1 . . . 706-K receives RF signals transmitted from the UE 704. For example, each of the reception antennas 722-1, 722-2 of the repeater 706-1 may receive RF signals transmitted from the antennas 712-1, 712-2 of the UE 704. A respective reception chain 750 processes RF signals received through each of the reception antennas 722-1, 722-2. The reception chain 750 includes a down converter 756, an analog-to-digital converter 755, a conversion component 754 that includes a rate converter and/or filter(s), a CP removal component 753, a serial to parallel component 752, an FFT component 751.

Using the reception antenna 722-1 as an example, the corresponding down converter 756 processes the RF signals received through that antenna to obtain corresponding analog baseband signals, for example, through frequency down-conversion. The analog-to-digital converter 755 converts the analog baseband signals to digital samples. In particular, to generate the channel signal samples from a baseband waveform, the baseband waveform may be sampled at a rate higher than its Nyquist sampling rate by the analog-to-digital converter 755.

The digital samples are then passed through the conversion component 754, which contains one or more digital filters. The digital filters may perform various functions including I-Q imbalance compensation, carrier synchronization, and/or timing synchronization, etc. to eliminate some imperfections in hardware.

Figure 10:
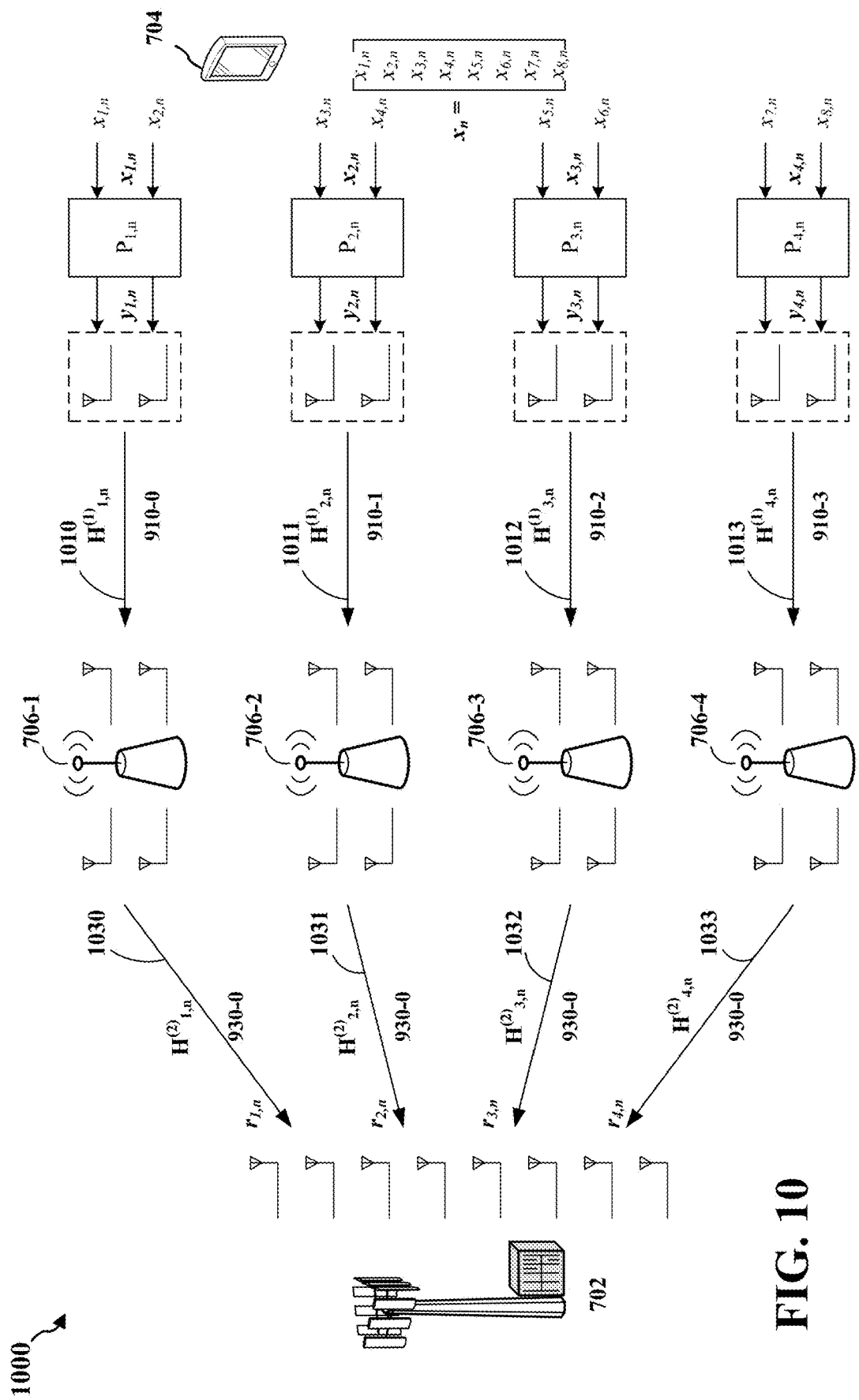
FIG. 10 is a diagram illustrating uplink transmission according to a non-coherent joint transmission (NCJT) approach.

FIG. 10 is a diagram 1000 illustrating uplink transmission according to a non-coherent joint transmission (NCJT) approach. Non-coherent transmission here means that coherent transmission of a transmission antenna across multiple $TTI_1$ intervals is not guaranteed. In this example, the base station 702 have 8 antennas corresponding 8 reception antenna ports and the UE 704 has 2 antennas corresponding 2 reception antenna ports. The repeaters 706-1, . . . , 706-K are placed between the base station 702 and the UE 704.

In the NCJT configuration, the UE 704 transmits multiple layers of baseband signals across multiple $TTI_1$ intervals (i.e., slots 920-0, . . . , 920-3) corresponding to one $TTI_2$ interval (i.e., slot 930-0) to the base station 702 through the repeaters 706-1, . . . , 706-K. In each of the multiple $TTI_1$ intervals, the UE 704 transmits some, but not all, of the multiple layers of baseband signals. The $TTI_2$ interval is subsequent to the corresponding $TTI_1$ intervals.

In this example, the UE 704 generates 8 layers baseband data signals $x_{1,n}, x_{2,n}, \ldots, x_{8,n}$ (or modulation symbols) on a subcarrier n, which can be represented by a vector:

$$x_{n_8 \times 1} = \begin{bmatrix} x_{1,n} \\ x_{2,n} \\ \vdots \\ x_{8,n} \end{bmatrix}.$$

The UE 704 divides the symbols $x_{n_8 \times 1}$ into 4 layer groups $x_{1_{2\times 1}}, x_{2_{2\times 1}}, x_{3_{2\times 1}}$ and $x_{4_{2\times 1}}$, each corresponding to one of the 4 TTI$_1$ intervals:

$$x_{1,n_2 \times 1} = \begin{bmatrix} x_{1,n} \\ x_{2,n} \end{bmatrix}; x_{2,n_2 \times 1} = \begin{bmatrix} x_{3,n} \\ x_{4,n} \end{bmatrix}; x_{3,n_2 \times 1} = \begin{bmatrix} x_{5,n} \\ x_{6,n} \end{bmatrix}; x_{4,n_2 \times 1} = \begin{bmatrix} x_{7,n} \\ x_{8,n} \end{bmatrix}.$$

During one TTI$_1$ interval, the UE 704 transmits baseband signals of one of the 4 layer groups, using a precoder to map the baseband signals of the corresponding layer group to the antennas of the UE 704. In each TTI$_1$ interval, the UE transmits signals by two antennas. Considering the 4 TTI$_1$ intervals together, the UE appears to be transmitting signals by 8 effective antennas, and the corresponding 8-by-1 precoder to be applied on the 8 effective antennas for each layer contains at most two non-zero elements corresponding to one of the four TTI$_1$ intervals. Note the 8-by-1 precoder can be equivalently expressed by four 2-by-1 precoders separately used in the 4 TTIs. This process ensures that the baseband signals are transmitted efficiently and effectively to the base station 702 through the repeaters 706-1 . . . 706-K.

In this example, more specifically, the UE 704 uses a precoder $P_{1,n_{2\times 2}}$ to map the baseband data signals $x_{1,n_{2\times 1}}$ on the subcarrier n to the 2 transmission antennas to generate 2 baseband signals $y_{1,n_{2\times 1}}$ in the slot 910-0, which can be represented as $y_{1,n_{2\times 1}} = P_{1,n_{2\times 2}} \cdot x_{1,n_{2\times 1}}$. Further, the UE 704 mixes $y_{1,n_{2\times 1}}$ with RF carriers of $f_1$ to generate 2 RF signals and transmits the RF signals to the repeater 706-1 in slot 910-0 through a channel 1010 which can be represented as $H_{1,n_{8\times 2}}^{(2)}$.

The repeater 706-1 receives, in the slot 920-0, the RF signals transmitted from the UE 704. The impact, of the rate conversion and frequency translation (RCFT) process, to the base band signals can be represented as $T_1$. The repeater 706-1 further transmits the RF signals of $f_2$, generated through the RCFT process, to the base station 702 in the slot 930-0 through a channel 1030 which can be represented as $H_{1,n_{8\times 2}}^{(2)}$.

Accordingly, on the subcarrier n, the baseband signals received by the base station 702 from the repeater 706-1 can be represented as $$r_{1,n_8 \times 1} H_{1,n_8 \times 2}^{(2)} \cdot T_1 \cdot H_{1,n_2 \times 2}^{(1)} \cdot P_{1,n_2 \times 2} \cdot x_{1,n_2 \times 1} + n_1 =$$

$$H_{1,n_8 \times 2}^{(2)} \cdot T_1 \cdot H_{1,n_2 \times 2}^{(1)} \cdot y_{1,n_2 \times 1} + n_1$$

$n_1$ is equivalent noise vector at the base station 702 which may contain the noise received at the repeater 706-1 and the base station 702.

Similarly, the repeaters 706-2, 706-3, 706-4 receive $y_{2,n_{2\times 1}}, y_{3,n_{2\times 1}}, y_{4,n_{2\times 1}}$ transmitted from the UE 704 on $f_1$ in the slots 920-1, 920-2, 920-3, respectively. The repeaters 706-2, 706-3, 706-4 process the received RF signals through the RCFT processes and transmit the result RF signals on $f_2$ in the slot 930-0.

The base station 702 receives the RF signals on $f_2$ transmitted from the repeaters 706-1 . . . 706-4 in the slot 940-0. The received baseband signal $r_{n_8 \times 1}$ at the base station 702 can be expressed as the sum of all signals received from the repeaters 706-1, . . . , 706-4 as follows:

$$r_{n_8 \times 1} = r_{1,n_8 \times 1} + r_{2,n_8 \times 1} + r_{3,n_8 \times 1} + r_{4,n_8 \times 1}$$
$$= H_{1,n_8 \times 2}^{(2)} \cdot T_1 \cdot H_{1,n_2 \times 2}^{(1)} \cdot P_{1,n_2 \times 2} \cdot x_{1,n_2 \times 1} + n_1 +$$
$$H_{2,n_8 \times 2}^{(2)} \cdot T_2 \cdot H_{2,n_2 \times 2}^{(1)} \cdot P_{2,n_2 \times 2} \cdot x_{2,n_2 \times 1} + n_2 +$$
$$H_{3,n_8 \times 2}^{(2)} \cdot T_3 \cdot H_{3,n_2 \times 2}^{(1)} \cdot P_{3,n_2 \times 2} \cdot x_{3,n_2 \times 1} + n_3 +$$
$$H_{4,n_8 \times 2}^{(2)} \cdot T_4 \cdot H_{4,n_2 \times 2}^{(1)} \cdot P_{4,n_2 \times 2} \cdot x_{4,n_2 \times 1} + n_4$$
$$= \sum_{l=1}^{4} H_{l,n_8 \times 2}^{(2)} \cdot T_l \cdot H_{l,n_2 \times 2}^{(1)} \cdot y_{l,n_2 \times 1} + n$$
$$= H_{eq,n} \cdot \begin{bmatrix} y_{l,1,n} \\ \ldots \\ y_{l,8,n} \end{bmatrix} + n$$

$H_{eq,n}$ is an equivalent channel matrix for the n-th subcarrier at the base station 702, which is given by $$H_{eq,n} = \left[ H_{1,n}^{(2)} \cdot T_1 \cdot H_{1,n}^{(1)}, \ldots, H_{4,n}^{(2)} \cdot T_4 \cdot H_{4,n}^{(1)} \right].$$

The base station 702 can decode the received baseband signal $r_{n_8 \times 1}$ based on the equivalent channel matrix $H_{eq,n}$ and the precoding matrices $P_{1,n}, P_{2,n}, P_{3,n},$ and $P_{4,n}$. By doing so, the base station 702 can recover the transmitted baseband data signals $x_{1,n} \ldots x_{4,n}$ (i.e., $x_{1,n}, x_{2,n}, \ldots, x_{8,n}$) and maintain the desired data transmission rate effectively.

Generally, the UE 704 has $N_T$ transmission antennas, the base station 702 has $N_R$ reception antennas and the L repeaters 706-1, . . . , 706-L with $M_T$ transmission antennas and $M_R$ reception antennas where $M_T = M_R = M$ are located between the UE 704 and the base station 702. The UE 704 may generate R layers baseband data signals. The UE 704 divides the R layers baseband data signals into L groups and each group has $R_l$ layers. The received baseband signal $r_n \in \mathbb{C}^{N_R \times 1}$ at the n-th subcarrier at the base station 702 is the sum of signal transmitted from L repeaters 706-1, . . . , 706-L and it can be expressed as below Equation (A):

$$r_n = \sum_{l=1}^{L} H_{l,n}^{(2)} T_{l,n} H_{l,n}^{(1)} \cdot P_{l,n} \cdot x_{l,n} + n_n = \sum_{l=1}^{L} H_{l,n}^{2} T_{l,n} H_{l,n}^{(1)} \cdot \begin{bmatrix} y_{l,1,n} \\ \ldots \\ y_{l,N_T,n} \end{bmatrix} + n_n$$

where $H_{l,n}^{(2)} \in \mathbb{C}^{N_R \times M}$ denotes the channel matrix in the second hop from the l-th repeater 706-1 to the base station 702, $H_{l,n}^{(1)} \in \mathbb{C}^{M \times N_T}$ denotes the channel matrix in the first hop from the UE 704 to the l-th repeater 706-1, $T_{l,n} \in \mathbb{C}^{M \times M}$ is an amplifying matrix describing the mapping from the repeater input to the repeater output, $n_n$ is the equivalent noise vector at the base station 702 which may contain the noise received at the repeaters 706-1, . . . , 706-L and the base station 702, $x_{l,n} \in \mathbb{C}^{R_l \times 1}$ denote the rank-$R_l$ signal transmitted by the UE over the l-th TTI$_1$ interval, $P_{l,n} \in \mathbb{C}^{N_T \times R_l}$ represent the precoding matrix of $x_{l,n}$ for the l-th spatial transmitting setting and $y_{l,i,n}$ denotes the frequency-domain baseband signal at the n-th subcarrier for the i-th Tx antenna.

In a period of L TTI$_1$ intervals, the UE 704 may be considered as having L·N$_T$ effective antennas; however, not all of the effective antennas are guaranteed for supporting coherent transmission of a spatial layer in the NCJT configuration. Since number of data layers can be transmitted is limited by number of Tx antennas of the UE, the UE 704 can transmit at most N$_T$ spatial layers in one TTI$_1$ interval. Hence, the total number of spatial layers in one TTI$_2$ interval is R=$\Sigma_{l=1}^{L} R_l$, where R$_l$≤N$_T$ for l=1, ... , L.

Based on the equation, the base station 702 can determine R layers baseband data signals x$_{1,n}$, x$_{2,n}$, ... , x$_{R,n}$ at the n-th subcarrier. In this example, N$_R$=8, N$_T$=2, M$_R$=M$_T$=M=2, R=8, L=4 and R$_l$=2 for l=1, ... , L.

Figure 11:
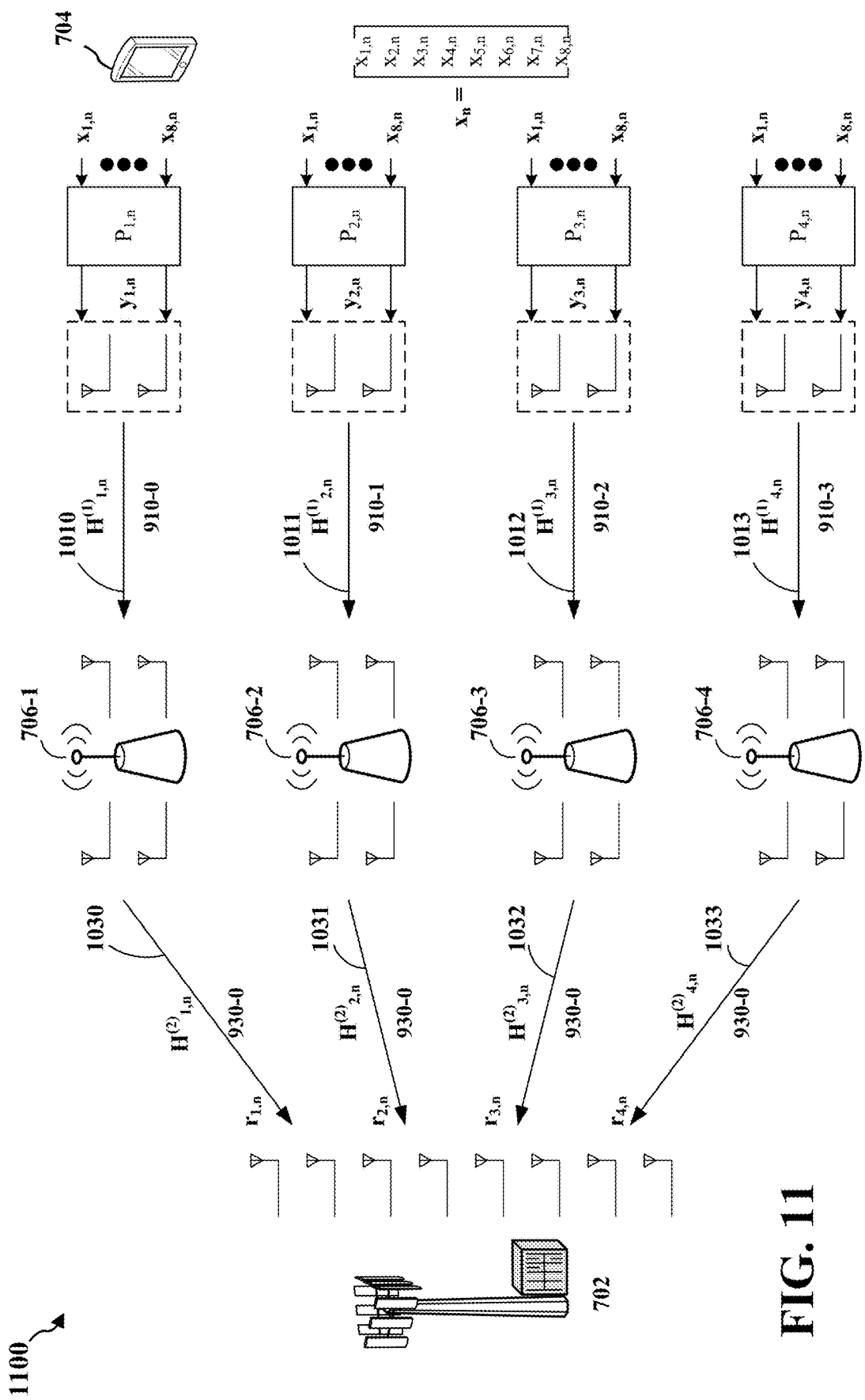
FIG. 11 is a diagram illustrating uplink transmission according to a coherent joint transmission (CJT) approach.

FIG. 11 is a diagram 1100 illustrating uplink transmission according to a coherent joint transmission (CJT) approach. Coherent transmission here means that coherent transmission of a transmission antenna across multiple TTI$_1$ intervals is guaranteed. In this example, the base station 702 have 8 antennas corresponding 8 reception antenna ports and the UE 704 has 2 antennas corresponding 2 transmission antenna ports. The repeaters 706-1, ... , 706-K are placed between the base station 702 and the UE 704.

In the CJT configuration, the UE 704 transmits all of the multiple layers of baseband signals across each of multiple TTI$_1$ intervals (i.e., slots 920-0, ... , 920-3) corresponding to one TTI$_2$ interval (i.e., slot 930-0) to the base station 702 through the repeaters 706-1, ... , 706-K. The TTI$_2$ interval is subsequent to the corresponding TTI$_1$ intervals. In each TTI$_1$ interval, the UE 704 transmits signals by two antennas. Considering the 4 TTI$_1$ intervals together, the UE 704 appears to be transmitting signals by 8 effective antennas. For the CJT configuration, the UE 704 should ensure coherent transmissions across the 4 TTI$_1$ intervals. In other words, one layer of baseband data signal can be coherently (or partially coherent) transmitted by the 8 effective transmission antennas.

In this example, the UE 704 generates 8 layers baseband data signals x$_{1,n}$, x$_{2,n}$, ... , x$_{8,n}$ (or modulation symbols) on a subcarrier n, which can be represented by a vector:

$$x_{n_{8\times1}} = \begin{bmatrix} x_{1,n} \\ x_{2,n} \\ \vdots \\ x_{8,n} \end{bmatrix}.$$

During one TTI$_1$ interval, the UE 704 transmits baseband signals of x$_{n_{8\times1}}$, using a precoder to map the baseband signals of the corresponding layer group to the antennas of the UE 704. This process ensures that the baseband signals are transmitted efficiently and effectively to the base station 702 through the repeaters 706-1 ... 706-K.

In this example, more specifically, the UE 704 uses a precoder P$_{1,n_{2\times8}}$ to map the baseband data signals x$_{n_{8\times1}}$ on the subcarrier n to the 2 transmission antennas to generate 2 baseband signals y$_{1,n_{2\times1}}$ in the slot 910-0, which can be represented as y$_{1,n_{2\times1}}$=P$_{1,n_{2\times8}}$·x$_{n_{8\times1}}$. Further, the UE 704 mixes y$_{1,n_{2\times1}}$ with RF carriers of f$_1$ to generate 2 RF signals and transmits the RF signals to the repeater 706-1 in slot 910-0 through the channel 1010 which can be represented as H$_{1,n_{2\times2}}^{(1)}$.

The repeater 706-1 receives, in the slot 920-0, the RF signals transmitted from the UE 704. The impact, of the rate conversion and frequency translation (RCFT) process, to the base band signals can be represented as T$_1$. The repeater 706-1 further transmits the RF signals of f$_2$, generated through the RCFT process, to the base station 702 in the slot 930-0 through the channel 1030 which can be represented as H$_{1,n_{8\times1}}^{(2)}$. Accordingly, on the subcarrier n, the baseband signals received by the base station 702 from the repeater 706-1 can be represented as $$r_{1,n_{8\times1}} H_{1,n_{8\times2}}^{(2)} \cdot T_1 \cdot H_{1,n_{2\times2}}^{(1)} \cdot P_{1,n_{2\times8}} \cdot x_{n_{8\times1}} + n_1 =$$
$$H_{1,n_{8\times2}}^{(2)} \cdot T_1 \cdot H_{1,n_{2\times2}}^{(1)} \cdot y_{1,n_{2\times1}} + n_1$$

n$_1$ is equivalent noise vector at the base station 702 which may contain the noise received at the repeater 706-1 and the base station 702.

Similarly, the repeaters 706-2, 706-3, 706-4 receive y$_{2,n_{2\times1}}$, y$_{3,n_{2\times1}}$, y$_{4,n_{2\times1}}$ transmitted from the UE 704 on f$_1$ in the slots 920-1, 920-2, 920-3, respectively. The repeaters 706-2, 706-3, 706-4 process the received RF signals through the RCFT processes and transmit the result RF signals on f$_2$ in the slot 930-0.

The base station 702 receives the RF signals on f$_2$ transmitted from the repeaters 706-1 ... 706-4 in the slot 940-0. The received baseband signal r$_{n_{8\times1}}$ at the base station 702 can be expressed as the sum of all signals received from the repeaters 706-1, ... , 706-4 as follows:

$$r_{n_{8\times1}} =$$
$$r_{1,n_{8\times1}} + r_{2,n_{8\times1}} + r_{3,n_{8\times1}} + r_{4,n_{8\times1}} = H_{1,n_{8\times2}}^{(2)} \cdot T_1 \cdot H_{1,n_{2\times2}}^{(1)} \cdot P_{1,n_{2\times8}} \cdot x_{n_{8\times1}} +$$
$$n_1 + H_{2,n_{8\times2}}^{(2)} \cdot T_2 \cdot H_{2,n_{2\times2}}^{(1)} \cdot P_{2,n_{2\times8}} \cdot x_{n_{8\times1}} + n_2 + H_{3,n_{8\times2}}^{(2)} \cdot T_3 \cdot$$
$$H_{3,n_{2\times2}}^{(1)} \cdot P_{3,n_{2\times8}} \cdot x_{n_{8\times1}} + n_3 + H_{4,n_{8\times2}}^{(2)} \cdot T_4 \cdot H_{4,n_{2\times2}}^{(1)} \cdot P_{4,n_{2\times8}} \cdot x_{n_{8\times1}} +$$
$$n_4 = [H_{1,n_{8\times2}}^{(2)} \cdot T_1 \cdot H_{1,n_{2\times2}}^{(1)} \ldots H_{4,n_{8\times2}}^{(2)} \cdot T_4 \cdot H_{4,n_{2\times2}}^{(1)}] \cdot \begin{bmatrix} P_{1,n_{2\times8}} \cdot x_{n_{8\times1}} \\ P_{2,n_{2\times8}} \cdot x_{n_{8\times1}} \\ P_{3,n_{2\times8}} \cdot x_{n_{8\times1}} \\ P_{4,n_{2\times8}} \cdot x_{n_{8\times1}} \end{bmatrix} +$$
$$n = [H_{1,n_{8\times2}}^{(2)} \cdot T_1 \cdot H_{1,n_{2\times2}}^{(1)} \ldots H_{4,n_{8\times2}}^{(2)} \cdot T_4 \cdot H_{4,n_{2\times2}}^{(1)}] \cdot \begin{bmatrix} y_{1,n_{2\times1}} \\ y_{2,n_{2\times1}} \\ y_{3,n_{2\times1}} \\ y_{4,n_{2\times1}} \end{bmatrix} + n =$$
$$H_{eq,n} \cdot y_{n_{8\times1}} + n$$

where the 8-rank matrix $$H_{eq,n} = [H_{1,n_{8\times2}}^{(2)} \cdot T_1 \cdot H_{1,n_{2\times2}}^{(1)} \; H_{4,n_{8\times2}}^{(2)} \cdot T_4 \cdot H_{4,n_{2\times2}}^{(1)}].$$

As such, based on the equation r$_{n_{8\times1}}$=H$_{eq,n}$·y$_{n_{8\times1}}$+n and y$_{i,n_{2\times1}}$=P$_{i,n_{2\times8}}$·x$_{n_{8\times1}}$ for i=1, ... , 4, the base station 702 can determine 8 layers baseband data signals x$_{1,n}$, x$_{2,n}$, ... , x$_{8,n}$.

Generally, the UE 704 has N$_T$ transmission antennas, the base station 702 has N$_R$ reception antennas and the L repeaters 706-1, ... , 706-L with M$_T$ transmission antennas and M$_R$ reception antennas where M$_T$=M$_R$=M are located between the UE 704 and the base station 702. The UE 704 may generate R layers baseband data signals. The received baseband signal r$_n \in \mathbb{C}^{N_R \times 1}$ at the n-th subcarrier at the base station 702 is the sum of signal transmitted from L repeaters 706-1, ... , 706-L and it can be expressed as below Equation (B):

$$r_n = \sum_{l=1}^{L} H_{l,n}^{(2)} T_{l,n} H_{l,n}^{(1)} \cdot P_{l,n} \cdot x_n + n_n = \sum_{l=1}^{L} H_{l,n}^{(2)} T_{l,n} H_{l,n}^{(1)} \cdot \begin{bmatrix} y_{l,1,n} \\ \cdots \\ y_{l,N_T,n} \end{bmatrix} + n_n$$

where $H_{l,n}^{(2)} \in \mathbb{C}^{N_R \times M}$ denotes the channel matrix in the second hop from the l-th repeater 706-1 to the base station 702, $H_{l,n}^{(1)} \in \mathbb{C}^{M \times N_T}$ denotes the channel matrix in the first hop from the UE 704 to the l-th repeater 706-1, $T_{l,n} \in \mathbb{C}^{M \times M}$ is an amplifying matrix describing the mapping from the repeater input to the repeater output, $P_{l,n} \in \mathbb{C}^{N_T \times R}$ represents the precoding matrix for the l-th spatial transmitting setting, and $n_n \in \mathbb{C}^{N_R \times 1}$ is the equivalent noise vector at the base station 702 which may contain the noise received at the repeaters 706-1, . . . , 706-L and the base station 702. In a period of L TTI$_1$ intervals, the UE 704 may be considered as having L·N$_T$ effective antennas. In this formulation, the rank-R signal $x_n$ is precoded by $P_{1,n}$ and transmitted by the UE over the l-th TTI$_1$ interval between $(t_0 \times TTI_2 + (l-1) \times TTI_1, t_0 \times TTI_2 + l \times TTI_1)$ for l=1, . . . , L. By stacking the precoding matrix over L TTI$_1$ intervals, the equivalent precoding matrix can be formulated as $P_{eq,n} = [P_{1,n}^T, \ldots, P_{L,n}^T]^T \in \mathbb{C}^{L N_T \times R}$ and the received baseband signal $r_n \in \mathbb{C}^{N_R \times 1}$ can be rewrite as $$r_n = [H_{1,n}^{(2)} \cdot T_{1,n} \cdot H_{1,n}^{(1)} \ \cdots \ H_{L,n}^{(2)} \cdot T_{L,n} \cdot H_{L,n}^{(1)}]_{N_R \times L N_T} \cdot \begin{bmatrix} P_{1,n} \\ \cdots \\ P_{L,n} \end{bmatrix} \cdot x_n + n_n =$$

$$H_{eq,n} \cdot P_{eq,n} \cdot x_n + n_n$$

where $$H_{eq,n} = [H_{1,n}^{(2)} \cdot T_{1,n} \cdot H_{1,n}^{(1)} \ \cdots \ H_{L,n}^{(2)} \cdot T_{L,n} \cdot H_{L,n}^{(1)}] \in \mathbb{C}^{N_R \times L N_T}$$

is the equivalent channel matrix. The j-th layer data corresponding to the j-th element of $x_n$ is precoded by the j-th column of $P_{eq,n}$. Note each 8-by-1 precoder (i.e., each column vector of $P_{eq,n}$) used for each layer can be expressed by four 2-by-1 precoders separately used in the 4 TTIs.

In both NCJT and CJT approaches above, the precoders used by UE are determined either by base station or by the UE itself, according to channel state information of UL channels. The base station can determine the precoders based on measuring sounding reference signal sent by the UE to obtain channel state information and can indicate the precoders to the UE for UL data transmissions. For the case where the UE determines the precoders, the UE may rely on measuring reference signals sent from the base station and may assume channel reciprocity to obtain channel state information.

Figure 12:
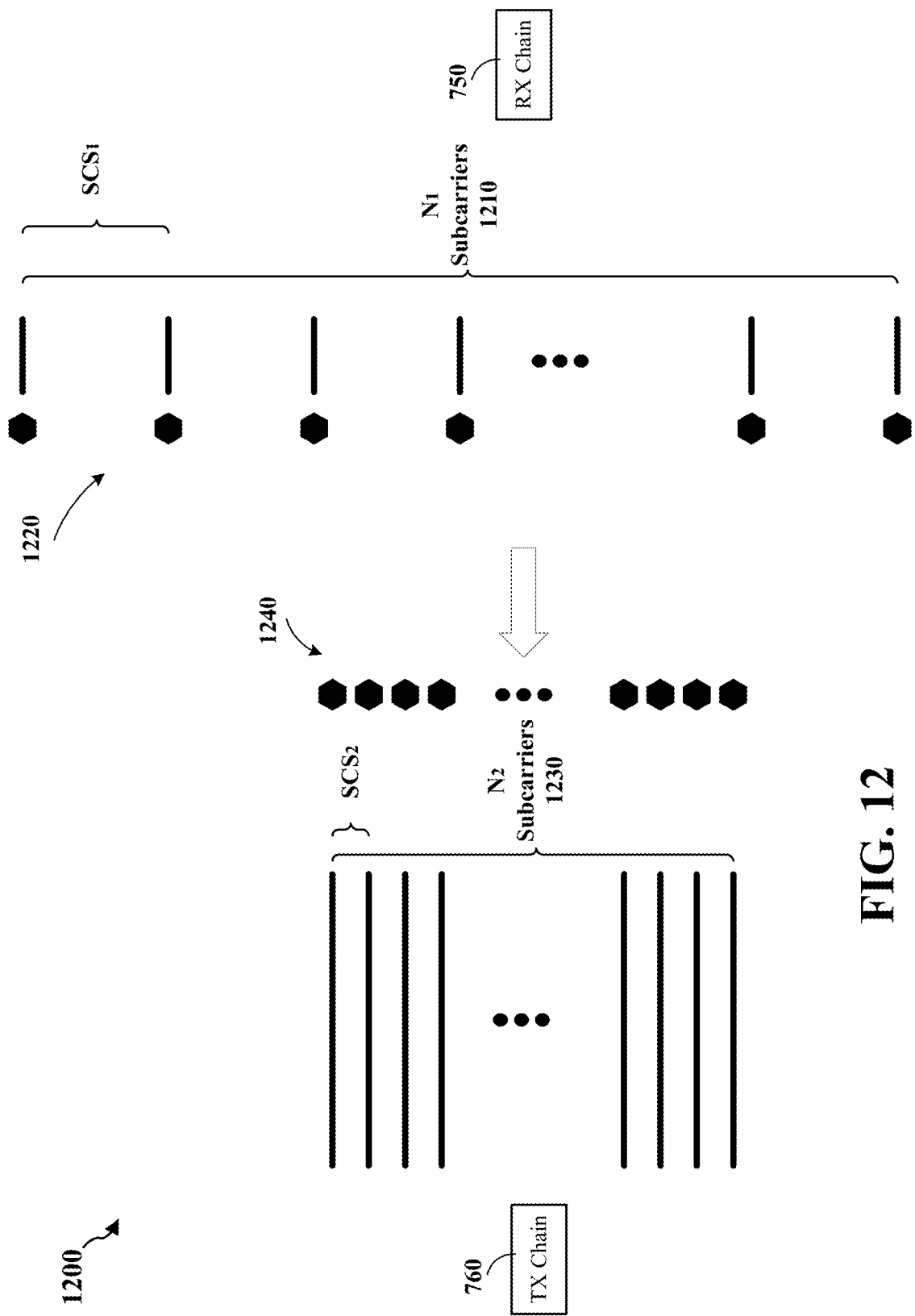
FIG. 12 is a diagram illustrating signal transformation at a repeater.

FIG. 12 is a diagram 1200 illustrating signal transformation at a repeater. Using the reception antenna 722-1 of the repeater 706-1 as an example, the FFT component 751 of the reception antenna 722-1 has a size N$_1$. The filtered digital samples from the conversion component 754 are passed through a down-sampling block, when necessary, to convert the data rate of the digital sample stream to match the FFT size N$_1$. Accordingly, the positions of the OFDM symbols can be determined in the down converted digital samples. Once digital samples within an OFDM symbol are found, the CP removal component 753 removes the cyclic prefix (CP) used to prevent inter-symbol interference (ISI). The serial to parallel component 752 groups N$_1$ data samples as an input vector for the FFT component 751. The FFT component 751 outputs N$_1$ modulation symbols $\tilde{g}_{k,1}$ 1220, which are a combination of $s_{k,1}$ to $s_{k,2}$ as received at the reception antenna 722-1 of the repeater 706-1. Further, the N$_1$ modulation symbols $\tilde{g}_{k,1}$ 1220 are carried on N$_1$ subcarriers 1210 with a SCS$_1$.

As described supra, each of the repeaters 706-1 . . . 706-K has transmission antennas 724-1, 724-2 and uses a respective transmission chain 760 to generate RF signals to be transmitted through each transmission antenna. Further, each transmission chain 760 corresponds to a respective reception chain 750. As described infra, modulation symbols received through a reception antenna of the repeater are retransmitted through a corresponding transmission antenna.

Using the repeater 706-1 as an example (M$_r$=M$_t$=M=2), the reception antennas 722-1, 722-2 correspond to the transmission antennas 724-1, 724-2. More specifically, $\tilde{g}_{k,1}$ 1220 received through the reception chain 750 of the reception antenna 722-1 are retransmitted through the transmission chain 760 of the transmission antenna 724-1. In a more general case with M$_r$·M$_t$, a mapping from the M$_t$ transmission antennas to the M$_r$ reception antennas is needed and may be provided by a linear transformation matrix. In other words, N$_2$ modulation symbols m$_{k,1}$ 1240, which are inputs for retransmitting through the transmission chain 760 of the transmission antenna 724-1 are selected from or are linear combination of $\tilde{g}_{k,1}$ received in the reception antenna 722-1. If M$_r$ is equal to M$_t$, the linear transformation matrix can be simply an identity matrix representing one-to-one mapping between one reception antenna and one transmission antenna.

The transmission chain 760 uses N$_2$ subcarriers 1230 having a SCS$_2$. The IFFT component 761 uses N$_2$ points and has N$_2$ inputs/outputs. The repeater 706-1 is configured with a predetermined rule that maps the N$_1$ outputs of the FFT component 751 to the N$_2$ inputs of the IFFT component 761.

More specifically, the repeater 706-1 applies a group of N$_2$ modulation symbols m$_{k,1}$ 1240 to the N$_2$ subcarriers 1230 in an OFDM symbol B. The N$_2$ subcarriers 1230 carrying the N$_2$ modulation symbols m$_{k,1}$ 1240 are sent to the IFFT component 761 with N$_2$ inputs. The N$_2$ digital samples output from the IFFT component 761 are treated as a time sequence and sent to the parallel to serial component 762 to form a time domain signal. The CP insertion component 763 receives the time domain signal and adds a cyclic prefix, resulting a time domain signal spanning an OFDM symbol B, which corresponds to SCS$_2$. The resulting time domain signal is in digital form, and is processed through a conversion component 764 that includes a rate converter and/or filter(s) to achieve a desired sample rate. The converted time domain signal in digital form is sent to the digital-to-analog converter 765, which accordingly generates an analog time domain signal. Subsequently, the up converter 766 receives the analog time domain signal and mixes the analog time domain signal with a second carrier frequency (f$_2$) to generate a RF signal. The RF signal is transmitted through the transmission antenna 724-1 of the repeater 706-1. In particular, the second carrier frequency of the RF signals transmitted from the repeaters 706-1 . . . 706-K may be in FR1.

Referring back to FIG. 7, in certain configurations, modulation symbols to be transmitted through an i$^{th}$ antenna port (e.g., the 1$^{st}$ antenna port corresponding to the antenna 712-1) of the UE 704 in a k$^{th}$ OFDM symbol A are denoted as $z_{k,i}$ with $z_{k,i} \in \mathbb{C}^{N_2 \times 1}$. $z_{k,i}$ are mapped to the selected N$_2$ (e.g., 1024) inputs out of total N$_1$ inputs (e.g., 4096), denoted as $\tilde{z}_{k,i} \in \mathbb{C}^{N_1 \times 1}$, of the IFFT component 741 according to an invertible mapping function $f(i)$, where $z_{k,i}=[z_{k,i,0}, z_{k,i,1}, \ldots, z_{k,i,N_2-1}]^T$ and $\tilde{z}_{k,i}=[\tilde{z}_{k,i,0}, \tilde{z}_{k,i,1}, \ldots, \tilde{z}_{k,i,N_1-1}]^T$. $f(i)$ returns the index in $\tilde{z}_{k,i}$ that is mapped from the $i^{th}$ element in $z_{k,i}$. That is, the function $f(i)$ gives the index in the transformed vector $\tilde{z}_{k,i}$ that corresponds to the $i^{th}$ element in the original vector $z_{k,i}$. As an example, the function can be defined as $$f(i) = i + \frac{N_1 - N_2}{2}.$$

Accordingly, it can be determined that $$\tilde{z}_{k,i} = \begin{bmatrix} 0^T_{\frac{N_1-N_2}{2}} & z^T_{k,i} & 0^T_{\frac{N_1-N_2}{2}} \end{bmatrix}^T,$$

where $$0^T_{\frac{N_1-N_2}{2}}$$

is a row vector of zeros with the length $$\frac{N_1 - N_2}{2}.$$

The $N_2$ modulation symbols in $z_{k,i}$ are created by layer mapping and precoding stages in the UE 704 based on encoded data streams. Following the invertible mapping function $f(i)$, the resulting $N_1$ modulation symbols in $\tilde{z}_{k,i}$ are fed into the IFFT component 741 of the transmission chain 740 for the $i^{th}$ antenna port. The IFFT component 741 performs the inverse fast Fourier transform on the input vector to generate a time-domain signal with $N_1$ samples. After the IFFT operation, the parallel to serial component 742 processes the $N_1$ time-domain samples and outputs a single time-domain signal. The CP insertion component 743 adds a cyclic prefix to this time-domain signal, resulting in an OFDM symbol A with a subcarrier spacing of $SCS_1$. The output signal from the CP insertion component 743 is then sent to the conversion component 744, which performs rate conversion and filtering to adapt the signal for transmission. The digital-to-analog converter 745 subsequently converts the processed digital signal into an analog signal, which is then mixed with the first carrier frequency $f_1$ by the up converter 746. The mixed signal is then transmitted through the transmission antenna corresponding to the $i^{th}$ antenna port (e.g., the antenna 712-1 or 712-2) of the UE 704.

As described supra, the repeaters 706-1 ... 706-K receives the RF signals from the UE 704 and processes the received RF signals. In particular, as described supra, the inverse function $$f^{-1}(i) = i - \frac{N_1 - N_2}{2}$$

is utilized to map $\tilde{g}_{k,i}$ to $m_{k,i}$ at the repeaters 706-1 ... 706-K. As a result, the input vector $m_{k,i}$ of the IFFT component 761 can be expressed as $$\begin{bmatrix} 0^T_{\frac{N_1-N_2}{2}} & \tilde{g}^T_{k,i} & 0^T_{\frac{N_1-N_2}{2}} \end{bmatrix}^T$$

at the repeaters 706-1 ... 706-K.

Accordingly, the repeaters 706-1 ... 706-K can use an option described infra to construct $m_{k,i}$, which are the input vector of the IFFT component 761, based on $\tilde{g}_{k,i}$. The mapping from $\tilde{g}_{k,i}=[\tilde{g}_{k,i,0}, \ldots, \tilde{g}_{k,i,N_1-1}]^T$ to $m_{k,i}=[m_{k,i,0}, \ldots, m_{k,i,N_2-1}]^T$ is determined according to a rule that maps $z_{k,i}=[z_{k,i,0}, \ldots, z_{k,i,N_2-1}]^T$ to $\tilde{z}_{k,i}=[\tilde{z}_{k,i,0}, \ldots, \tilde{z}_{k,i,N_1-1}]^T$ in a transmission (Tx) chain of the UE 704. $m_{k,i} \in \mathbb{C}^{N_2 \times 1}$ are the inputs of the IFFT function in the Tx-chain of the repeater 706-1, $z_{k,i} \in \mathbb{C}^{N_2 \times 1}$ carry the baseband signal in the frequency domain for the Tx antenna port directed to the Tx-chain of the UE 704, and $\tilde{z}_{k,i} \in \mathbb{C}^{N_1 \times 1}$ are the inputs of the IFFT at the UE 704. $N_2$ elements of $\tilde{z}_{k,i}$ are one-to-one mapped from all the elements in $z_{k,i}$. An invertible mapping, denoted as $f(i)$ returns the index in $\tilde{z}_{k,i}$ that is mapped from the i-th element in $z_{k,i}$. For the other elements not in the range of $f(\cdot)$, one option is to set them to zeros. Then the mapping from $\tilde{g}_{k,i}$ to $m_{k,i}$ is done by the inverse function $f^{-1}(\cdot)$ that takes the elements whose indexes are in the range of $f(\cdot)$. For example, given the invertible function $$f(i) = i + \frac{N_1 - N_2}{2},$$

$\tilde{z}_{k,i}=[(0_{(N_1-N_2)/2})^T \ z_{k,i}^T \ (0_{(N_2-N_1)/2})^T]^T$ can be derived, where $0_{(N_2-N_1)/2}$ is a zero vector of size $(N_2-N_1)/2$. Then $m_{k,i}$ is taken from the center $N_2$ elements of $\tilde{g}_{k,i}$. Finally, IFFT component 761 is obtained from $m_{k,i}$ through the $N_2$-point FFT function and then the P-to-S conversion in the Tx chain.

Figure 13:
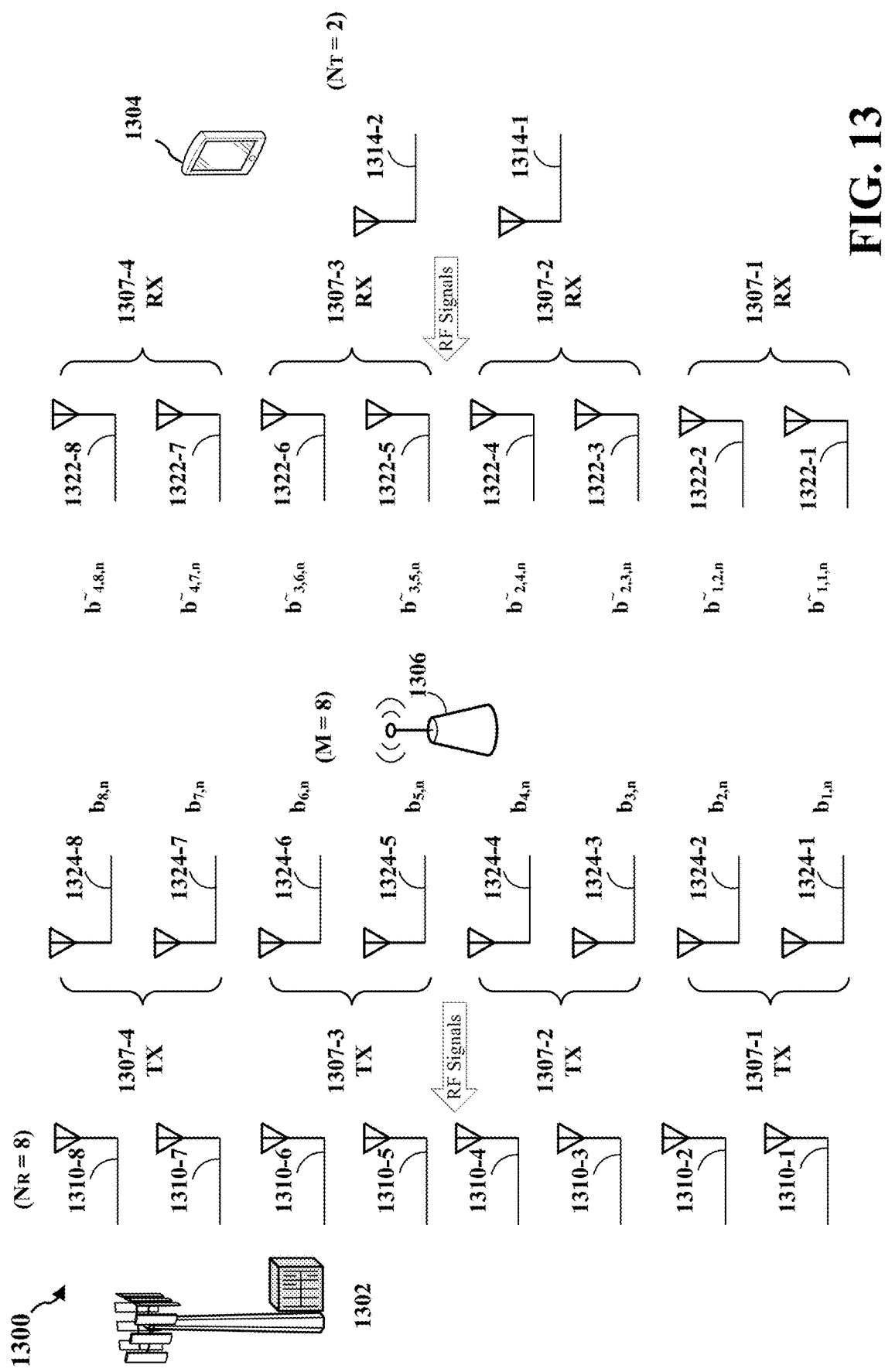
FIG. 13 is a diagram 1300 illustrating uplink MIMO transmission from a UE to a base station via one repeater.

FIG. 13 is a diagram 1300 illustrating uplink MIMO transmission from a UE to a base station via one repeater. In this example, a base station 1302 has 8 reception antennas 1310-1, 1310-2, ... 1310-8, and a UE 1304 has 2 transmission antennas 1314-1, 1314-2. Further, a repeater 1306 is placed between the base station 1302 and the UE 1304. The repeater 1306 has 8 reception antennas 1322-1, 1322-2, ..., 1322-8 and 8 transmission antennas 1324-1, 1324-2, ..., 1324-8. In certain configurations, the same antenna may function as a reception antenna and a transmission antenna.

Figure 14:
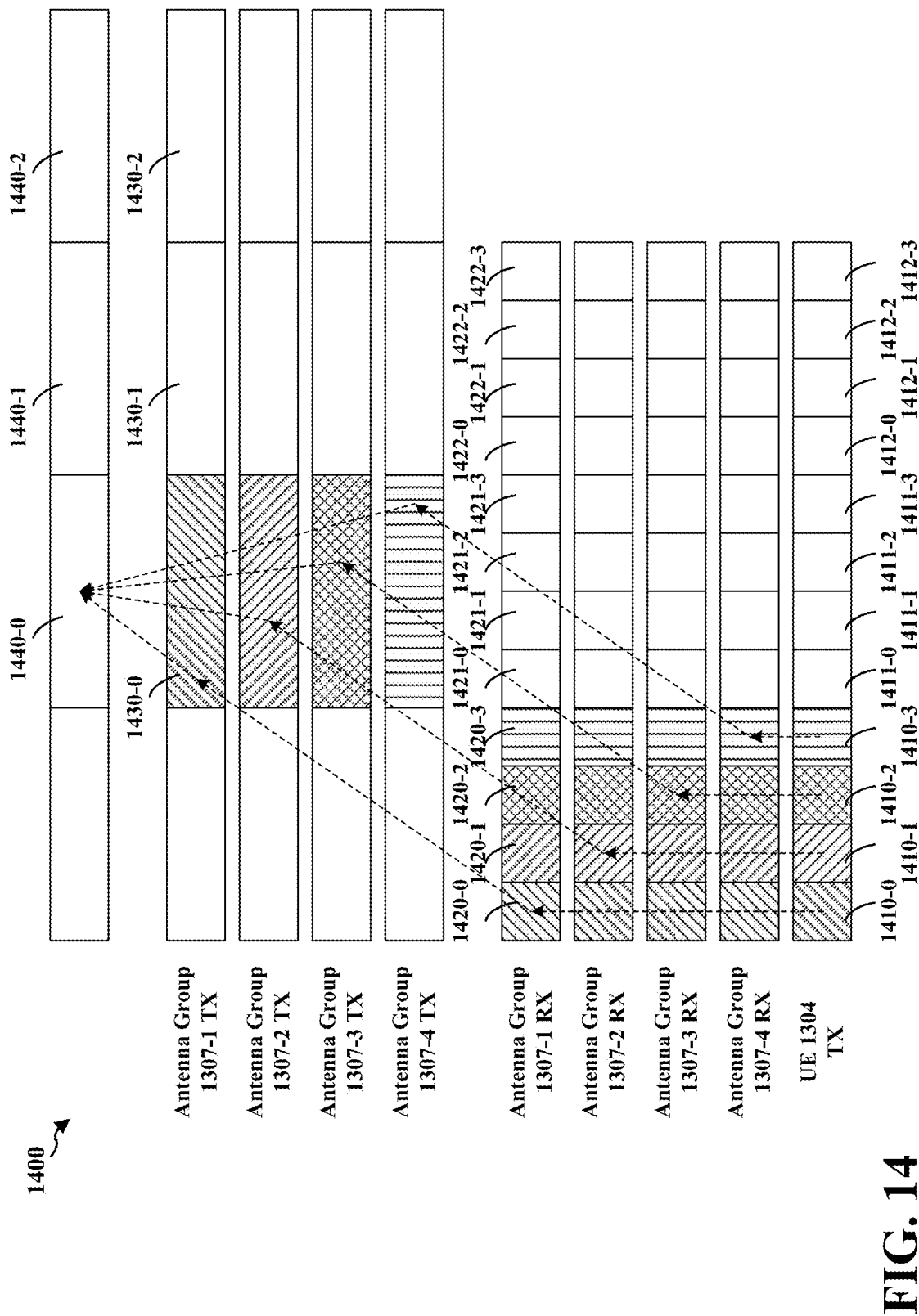
FIG. 14 is a diagram 1400 illustrating uplink transmission timing from a UE to a base station via one repeater.

FIG. 14 is a diagram 1400 illustrating uplink transmission timing from a UE to a base station via one repeater. The UE 1304 transmits, through the transmission antennas 1314-1, 1314-2, RF signals on a first carrier frequency in slots 1410-0, ..., 1410-$q$, slots 1411-0, ..., 1411-$q$, and slots 1412-0, ..., 1412-$q$, etc. The slots 1410-0, ..., 1410-$q$, etc. are corresponding to a first subcarrier spacing ($SCS_1$, e.g., 120 kHz). The repeater 1306 receives the RF signals of the first carrier frequency in the slots 1420-0, ..., 1420-$q$, slots 1421-0, ..., 1421-$q$, and slots 1422-0, ..., 1422-$q$, etc. The repeaters 1306 transforms a first set of baseband signals carried on the RF signals of the first carrier frequency to obtain a second set of baseband signals, and transmits the second set of baseband signals over RF signals of a second carrier frequency in slots 1430-0, 1430-1, 1430-2, etc. As described infra, the slots 1430-0, 1430-1, 1430-2, etc. are corresponding to a second subcarrier spacing ($SCS_2$, e.g., 30 kHz). The base station 1302 receives the RF signals of the second carrier frequency in slots 1440-0, 1440-1, 1440-2, etc. The slots 1440-0, 1440-1, 1440-2, etc. are corresponding to the second subcarrier spacing ($SCS_2$). Further, in this example, q is 3.

In NR, a slot may be an interval occupied by 14 OFDM symbols. The repeater receives signals at the first frequency in the high frequency band, which may not be able to be used for direct transmission to the base station due to limited coverage. After the repeater operations, the signals are forwarded by the repeaters at the second frequency in the low frequency band, which provides much wider coverage for the base station. As a result, the un-used/out-of-coverage bandwidth in the high frequency band can be traded for additional spatial multiplexing gain in the low frequency band.

The time duration of each of the slots 1420-0, . . . , 1420-$q$, etc. is $TTI_1$. The time duration of each of the slots 1430-0, 1430-1, 1430-2, etc. is $TTI_2$. Denote $L = SCS_1/SCS_2 = TTI_2/TTI_1$. Denote the first carrier frequency as $f_1$, and the second carrier frequency as $f_2$. Each $TTI_2$ interval in $f_2$ corresponds to L $TTI_1$ intervals in $f_1$.

In this example, as described supra, the repeater 1306 has 8 reception antennas, and the UE 1304 has 2 transmission antennas. Accordingly, the 8 reception antennas of the repeater 1306 are divided into $$\left\lceil \frac{8}{2} \right\rceil = 4$$

antenna groups 1307-1 RX, . . . , 1307-4 RX and each group contains 2 reception antennas. More specifically, the reception antennas 1322-1 and 1322-2 are mapped into the antenna group 1307-1 RX; the reception antennas 1322-3 and 1322-4 are mapped into the antenna group 1307-2 RX; the reception antennas 1322-5 and 1322-6 are mapped into the antenna group 1307-3 RX and the reception antennas 1322-7 and 1322-8 are mapped into the antenna group 1307-4 RX. The 8 transmission antennas are divided into 4 corresponding groups 1307-1 TX, . . . , 1307-4 TX In this example, the reception antennas 1322-1 to 1322-8 of the repeater 1306 receive RF signals transmitted from the UE 1304 in the slots 1420-0 to 1420-3. As described supra referring to FIG. 12, the $N_1$ modulation symbols $\tilde{g}_{k,i}$ 1220 obtained through the i-th reception antenna of the repeater 1306 are mapped to the $N_2$ modulation symbols $m_{k,i}$ 1240 to be transmitted through the i-th transmission antenna of the repeater 1306.

In certain configurations, the $k^{th}$ reception antenna group of the repeater 1306 processes RF signals of $f_1$ received in a $TTI_1$ starting at $t_0 \times TTI_2 + (k-1) \times TTI_1$ (k=1, . . . , K) and the corresponding $k^{th}$ transmission antenna group transmits RF signals of $f_2$ in $(t_0+\text{offset}) \times TTI_2$. In this example, the offset is 1, which is set to provide sufficient time for signal receiving and processing at the repeater 1306. During a first $TTI_2$ interval (e.g., the slot 1430-0) correspond to the slots 1420-0 to 1420-3, the antenna group 1307-1 TX are used by the repeater 1306 to transmit to the base station 1302 the mapped $N_2$ modulation symbols $m_k$, 1240 corresponding to the $N_1$ modulation symbols $\tilde{g}_{k,i}$ (i=1, 2) received in the slot 1420-0, and ignores RF signals received in other slots. The antenna group 1307-2 TX are used by the repeater 1306 to transmit the mapped $N_2$ modulation symbols $m_k$, 1240 corresponding to the $N_1$ modulation symbols $\tilde{g}_{k,i}$ (i=3, 4) received in the slot 1420-1, and ignores RF signals received in other slots. The antenna group 1307-3 TX are used by the repeater 1306 to transmit to the base station 1302 the mapped $N_2$ modulation symbols $m_k$, 1240 corresponding to the $N_i$ modulation symbols $\tilde{g}_{k,i}$ (i=5, 6) received in the slot 1420-2, and ignores RF signals received in other slots. The antenna group 1307-4 TX are used by the repeater 1306 to transmit the mapped $N_2$ modulation symbols $m_k$, 1240 corresponding to the $N_1$ modulation symbols $\tilde{g}_{k,i}$ (i=7, 8) received in the slot 1420-3, and ignores RF signals received in other slots. This alternating process continues for subsequent $TTI_1$ intervals, allowing the repeater 1306 to efficiently transmit the signals received from the UE 1304 to the base station 1302.

In this manner, the repeater 1306 can efficiently utilize its reception antennas by grouping them and allocating different $TTI_1$ intervals for each group. This approach enables the UE 1304 to transmit more layers of signals to the repeater 1306 using its limited number of transmission antennas, but also allows for the possibility of multiple transmissions of the same signal within the corresponding $TTI_1$ interval, thereby enhancing the overall communication performance.

It should be noted that the described approach can be adapted to various configurations of the number of transmission antennas at the repeater, the number of reception antennas at the UE, and the relationship between the $TTI_1$ and $TTI_2$ intervals. The allocation of $TTI_2$ intervals and the grouping of transmission antennas can be adjusted accordingly to optimize the performance of the wireless communication system.

In general, a UE (e.g., the UE 1304) has $N_T$ transmission antennas and a repeater (e.g., the repeater 1306) has $M_T$ transmission antennas and $M_R$ reception antennas. In a simplified case, $M_T = M_R = M$ and $M > N_T$. Furthermore, the i-th reception antenna is paired with the i-th transmission antenna so that the signal to be transmitted by the i-th transmission antenna is derived from the signal received at the i-th reception antenna. Since each reception antenna can receive the RF signal from UE at time $t = t_0 \times TTI_2 + (l-1) \times TTI_1$ for l=1, . . . , L, the output analog signal for the corresponding transmission antenna may be generated according to the received signal over the L $TTI_1$ intervals and then it is transmitted at time $t = (t_0 + \text{offset}) \times TTI_2$, where the offset is set to provide sufficient time for signal receiving and processing. In other words, the analog output signal sent in one $TTI_2$ interval is based on the linear combination of the received signal over L $TTI_1$ intervals. The strategy for combining the signal from the L $TTI_1$ intervals in the first frequency as demonstrated below.

Denote the frequency domain baseband signal on the n-th subcarrier received at the i-th reception antenna at time $t = t_0 \times TTI_2 + (l-1) \times TTI_1$ by, where l=1, . . . , L, i=1, . . . , M, and n=1, . . . , N. The analog output signal for the i-th transmission antenna to be sent at time $t = (t_0 + \text{offset}) \times TTI_2$ is generated according to the linear combination of $\tilde{b}_{1,i,n}$, . . . , $\tilde{b}_{2,i,n}$, . . . , $\tilde{b}_{L,i,n}$ (with rate-converting and frequency-translating). Denote $\{w_{i,l}\}$ the coefficients for the linear combination, and the coefficient matrix can be expressed as $$W = \begin{bmatrix} w_{1,1} & \cdots & w_{1,L} \\ \vdots & \ddots & \vdots \\ w_{M,1} & \cdots & w_{M,L} \end{bmatrix} = [w_{:,1} \ \cdots \ w_{:,L}] = \begin{bmatrix} w_{1,:} \\ \vdots \\ w_{M,:} \end{bmatrix},$$

where $w_{:,l}$ is the l-th column of W for l=1, . . . , L, and $w_{i,:}$ is the i-th row of W for i=1, . . . M. The frequency domain baseband signal $b_{i,n}$ on the n-th subcarrier for the i-th transmission antenna (i=1, . . . M) can be expressed as $$b_{i,n} = \sum_{l=1}^{L} w_{i,l} \tilde{b}_{l,i,n} = w_{i,:} \begin{bmatrix} \tilde{b}_{1,i,n} \\ \tilde{b}_{2,i,n} \\ \vdots \\ \tilde{b}_{L,i,n} \end{bmatrix}.$$

Note that the signal received in one or multiple $TTI_1$ intervals may be combined first before rate-converting and frequency translating. To boost the spatial multiplexing gain in the second frequency, the M antennas may be partitioned into G groups, where each group contains $N_g$ antennas (g=1, ..., G). One principle is that the number of reception antennas in each group should be no less than $N_T$, (i.e., $N_g \geq N_T$). Besides, for each group of antennas, the signals received in at most $$\left\lceil \frac{L}{G} \right\rceil$$

$TTI_1$ intervals are combined and the signals received in the other $TTI_1$ intervals are ignored and not considered in the combination.

In this example of FIGS. 13-14, K=1, M=8, $N_T$=2 and L=4. The coefficients of the linear combination can be expressed as $$w = \begin{bmatrix} w_{1,:} \\ \vdots \\ w_{8,:} \end{bmatrix} = \begin{bmatrix} 1 & 0 & 0 & 0 \\ 1 & 0 & 0 & 0 \\ 0 & 1 & 0 & 0 \\ 0 & 1 & 0 & 0 \\ 0 & 0 & 1 & 0 \\ 0 & 0 & 1 & 0 \\ 0 & 0 & 0 & 1 \\ 0 & 0 & 0 & 1 \end{bmatrix}.$$

This is equivalent to set $w_{i,:} = e_{\lceil i/2 \rceil}^T$ for i=1, ..., M, where $e_n$ is the vector with L elements, in which the n-th element is 1 and the other elements are 0s. The signals to be sent in the i-th transmission antenna is only based on the signal received in the $\lceil i/2 \rceil$-th $TTI_1$ interval in the first frequency, and the other signal received in the other $TTI_1$ intervals is ignored.

In the example illustrated in FIG. 13, there are M=8 reception/transmission antennas at the repeater 1306 and $N_T$=2 transmission antennas at the UE 1304. Further, there are L=4 $TTI_1$ intervals. As a result, the 8 reception antennas at the repeater 1306 may be divided into $$G = \left\lfloor \frac{M}{N_T} \right\rfloor = 4$$

groups and each antenna group of the repeater 1306 contains $N_g = N_T = 2$ antennas. Antennas in the g-th group handle the signals received in at most L/G=1 $TTI_1$ interval (i.e., the g-th $TTI_1$ interval).

More specifically, on the n-th subcarrier, the reception antenna 1322-1 (i=1, in the antenna group 1307-1 RX) of the repeater 1306 receives the baseband signals $\tilde{b}_{1,1,n}$ through $\tilde{b}_{4,1,n}$ during its respective $TTI_1$ intervals (e.g., slots 1420-0 to 1420-3). The baseband signal $b_{1,n}$ to be transmitted at the transmission antenna 1324-1 (i=1, in the antenna group 1307-1 TX) of the repeater 1306 is derive from $$b_{1,n} = [1 \ 0 \ 0 \ 0] \begin{bmatrix} \tilde{b}_{1,1,n} \\ \tilde{b}_{2,1,n} \\ \tilde{b}_{3,1,n} \\ \tilde{b}_{4,1,n} \end{bmatrix} = \tilde{b}_{1,1,n}.$$

That is, the baseband signal $\tilde{b}_{1,1,n}$ received during the first $TTI_1$ interval (e.g., slot 1420-0) are maintained and the baseband signals received during the other $TTI_1$ intervals are ignored. Subsequently, the transmission antenna 1324-1 (i=1, in the antenna group 1307-1 TX) of the repeater 1306 transmits the baseband signal $b_{1,n}(\tilde{b}_{1,1,n})$ to the base station 1302 in the next $TTI_2$ interval (e.g., slot 1430-0).

Similarly, $b_{i,n}$, which is the baseband signal to be transmitted at the transmission antenna 1324-i (i=2 to 8) in the next $TTI_2$ interval (e.g., slot 1430-0), can be derived from the below equation as described supra:

$$b_{i,n} = \sum_{l=1}^{L} w_{i,l} \tilde{b}_{l,i,n} = w_{i,:} \begin{bmatrix} \tilde{b}_{1,i,n} \\ \tilde{b}_{2,i,n} \\ \vdots \\ \tilde{b}_{L,i,n} \end{bmatrix}.$$

More specifically,
$b_{2,n} = \tilde{b}_{1,2,n}$,
$b_{3,n} = \tilde{b}_{2,3,n}$,
$b_{4,n} = \tilde{b}_{2,4,n}$,
$b_{5,n} = \tilde{b}_{3,5,n}$,
$b_{6,n} = \tilde{b}_{3,6,n}$,
$b_{7,n} = \tilde{b}_{4,7,n}$,
$b_{8,n} = \tilde{b}_{4,8,n}$.

Generally, the UE can either precode each layer of data according to a CJT approach or precode each layer of data according to an NCJT approach. For the CJT approach, on the n-th subcarrier, the baseband equivalent signal received at the repeater in the l-th $TTI_1$ interval (l=1, ..., L) can be derived as $$\tilde{b}_{l,n} = \begin{bmatrix} \tilde{b}_{l,1,n} \\ \tilde{b}_{l,2,n} \\ \vdots \\ \tilde{b}_{l,M,n} \end{bmatrix} = H_{l,n}^{(1)} P_{l,n} x_n + n_{l,n},$$

where $H_n^{(1)} \in \mathbb{C}^{M \times N_T}$ denotes the channel matrix from the UE to the repeater in the l-th $TTI_1$ interval, the rank-R signal $x_n \in \mathbb{C}^{R \times 1}$ is precoded by $P_{l,n} \in \mathbb{C}^{N_T \times R}$ in the l-th $TTI_1$ interval and the r-th spatial layer is precoded by the r-th column vector of $P_{l,n}$ for all l=1, ..., L., $n_{l,n} \in \mathbb{C}^{M \times 1}$ is the received noise at the repeater.

For the NCJT approach, the UE can only can transmit at most $N_T$ spatial layers in one $TTI_1$ interval. The baseband equivalent signal received at the repeater in the l-th $TTI_1$ interval can be derived as $$\tilde{b}_{l,n} = \begin{bmatrix} \tilde{b}_{l,1,n} \\ \tilde{b}_{l,2,n} \\ \vdots \\ \tilde{b}_{l,M,n} \end{bmatrix} = H_n^{(1)} P_{l,n} x_{l,n} + n_{l,n},$$

where $x_{l,n} \in \mathbb{C}^{R_l \times 1}$ denotes the rank-$R_l$ signal transmitted by the UE over the l-th $TTI_1$ interval, and $P_{l,n} \in \mathbb{C}^{N_T \times R_l}$ represents the precoding matrix of $x_{l,n}$. Hence, the total number of spatial layers in one $TTI_2$ interval is $R = \Sigma_{l=1}^L R_l$. For both CJT and NCJT approach, the received signal vector $\tilde{b}_n$ obtained by stacking $\tilde{b}_{l,n}$ for all $l=1, \ldots, L$ can be expressed as $$\tilde{b}_n = \begin{bmatrix} \tilde{b}_{1,n} \\ \tilde{b}_{l,2,n} \\ \vdots \\ \tilde{b}_{l,M,n} \end{bmatrix} = \begin{bmatrix} H_{1,n}^{(1)} y_{1,n} \\ H_{2,n}^{(1)} y_{2,n} \\ \vdots \\ H_{L,n}^{(1)} y_{L,n} \end{bmatrix} + \begin{bmatrix} n_{1,n} \\ n_{2,n} \\ \vdots \\ n_{L,n} \end{bmatrix} = \begin{bmatrix} H_{1,n}^{(1)} & 0 & \cdots & 0 \\ 0 & H_{2,n}^{(1)} & \cdots & 0 \\ \vdots & \vdots & \ddots & \vdots \\ 0 & 0 & \cdots & H_{L,n}^{(1)} \end{bmatrix} \begin{bmatrix} y_{1,n} \\ y_{2,n} \\ \vdots \\ y_{L,n} \end{bmatrix} + n_n$$

$$= [e_1 \otimes H_{1,n}^{(1)} e_2 \otimes H_{2,n}^{(1)} \ldots e_L \otimes H_{L,n}^{(1)}] y_n + n_n,$$

where $y_{l,n} \in \mathbb{C}^{N_T \times 1}$ is the precoded baseband signal at the UE, $y_n = [y_{1,n}^T \ldots y_{L,n}^T]^T$, and $n_n = [n_{1,n}^T \ldots n_{L,n}^T]^T$. The transmitting signal $b_n \in \mathbb{C}^{M \times 1}$ at the repeater in the second frequency is the linear combination of the elements of $\tilde{b}_n$, which can be expressed as $$b_n = \begin{bmatrix} w_{1,:} \otimes e_1^T \\ w_{2,:} \otimes e_2^T \\ \vdots \\ w_{M,:} \otimes e_M^T \end{bmatrix} \tilde{b}_n = (W \cdot I)\tilde{b}_n = w_{:,1} \cdot H_{1,n}^{(1)}$$

$$= H_{eq,n}^{(1)} y_n + n_n,$$

where • is the transposed Khatri-Rao product (row-wise Kronecker product), the property $(W \cdot I)(e_l \otimes H_{l,n}^{(1)}) = w_{:,l} \cdot H_{l,n}^{(1)}$ is used for $l=1, \ldots, L$, and $H_{eq,n}^{(1)} \in \mathbb{C}^{M \times LN_T}$ is the equivalent channel matrix in the first hop over L TTIs.

The baseband equivalent signal $r_n \in \mathbb{C}^{N_R \times 1}$ at the n-th subcarrier received at the base station in the second frequency can be expressed as $$r_n = H_n^{(2)} T_n b_n + n_{r,n} = H_n^{(2)} T_n (H_{eq,n}^{(1)} y_n + n_n) + n_{r,n},$$

where $b_n = [b_{1,n}, \ldots, b_{M,n}]^T$ is the signal vector after linear combination and $b_{i,n} = \Sigma_{l=1}^L w_{l,i} \tilde{b}_{l,i,n}$, $H_n^{(2)} \in \mathbb{C}^{N_R \times M}$ denotes the channel from the repeater to the base station, $T_n \in \mathbb{C}^{M \times M}$ is an amplifying matrix, and $n_{r,n} \in \mathbb{C}^{N_R \times 1}$ is the received noise at the base station.

The base station 1302 receives the RF signals transmitted by the repeater 1306 on $f_2$ at its reception antennas 1310-1 through 1310-8. The received RF signals carry baseband signals $b_{i,n}$ transmitted by the repeater's transmission antennas during the $TTI_2$ interval. The base station 1302 first extracts the baseband signals $b_{i,n}$ (as received) from the received RF signals. Next, the base station 1302 combines the extracted baseband signals transmitted from different transmission antennas of the repeater 1306 to recover the original baseband signals that were transmitted by the UE on $f_1$.

Figure 15:
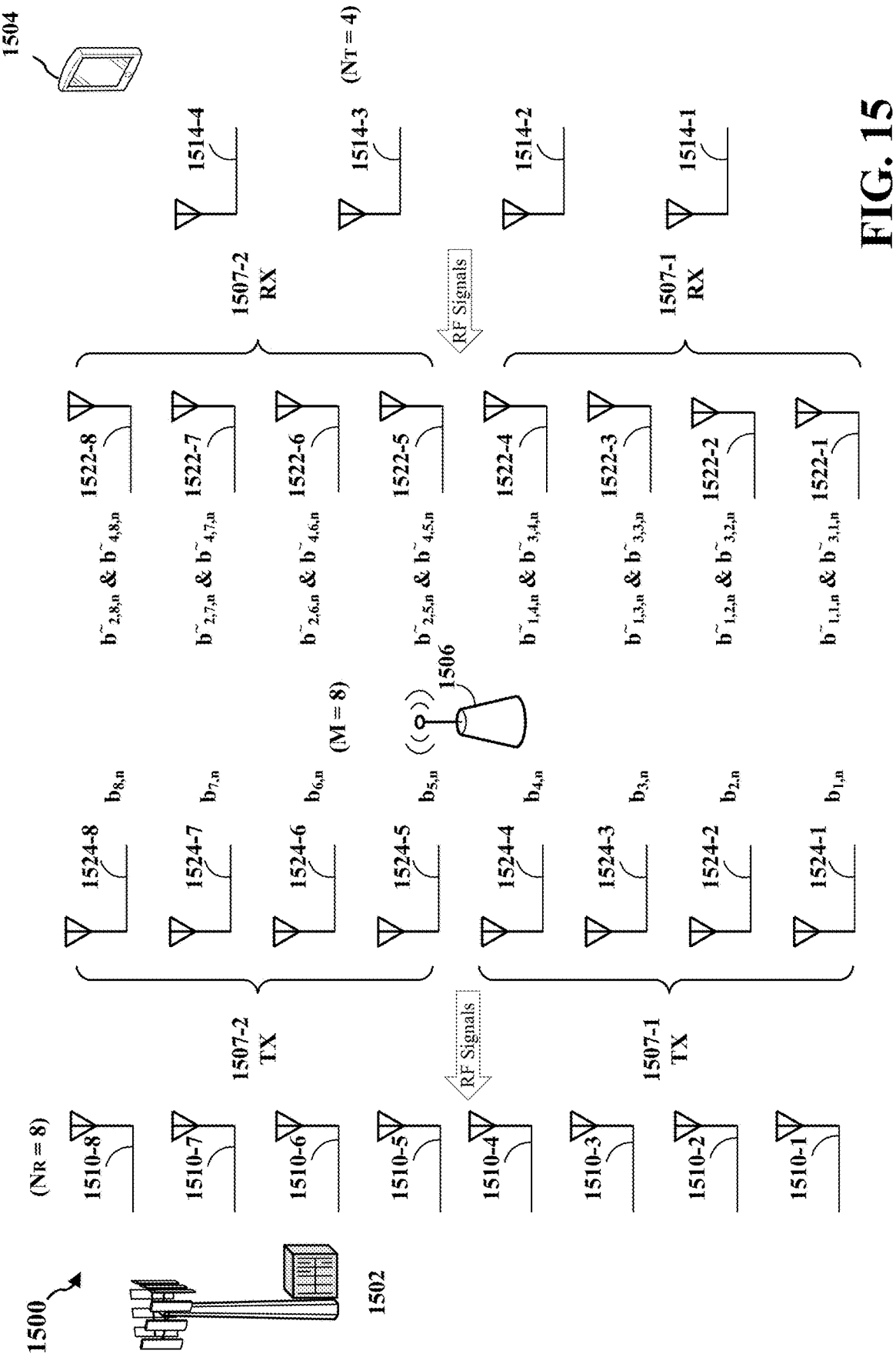
FIG. 15 is a diagram 1500 illustrating a second example of uplink MIMO transmission from a UE to a base station via one repeater.

FIG. 15 is a diagram 1500 illustrating a second example of uplink MIMO transmission from a UE to a base station via one repeater. In this example, a base station 1502 has 8 antennas 1510-1, 1510-2, ... 1510-8, and a UE 1504 has 4 transmission antennas 1514-1, 1514-2, 1514-3 and 1514-4. Further, a repeater 1506 is placed between the base station 1502 and the UE 1504. The repeater 1506 has 8 reception antennas 1522-1, 1522-2, ..., 1522-8 and 8 transmission antennas 1524-1, 1524-2, ..., 1524-8. In certain configurations, the same antenna may function as a reception antenna and a transmission antenna.

Figure 16:
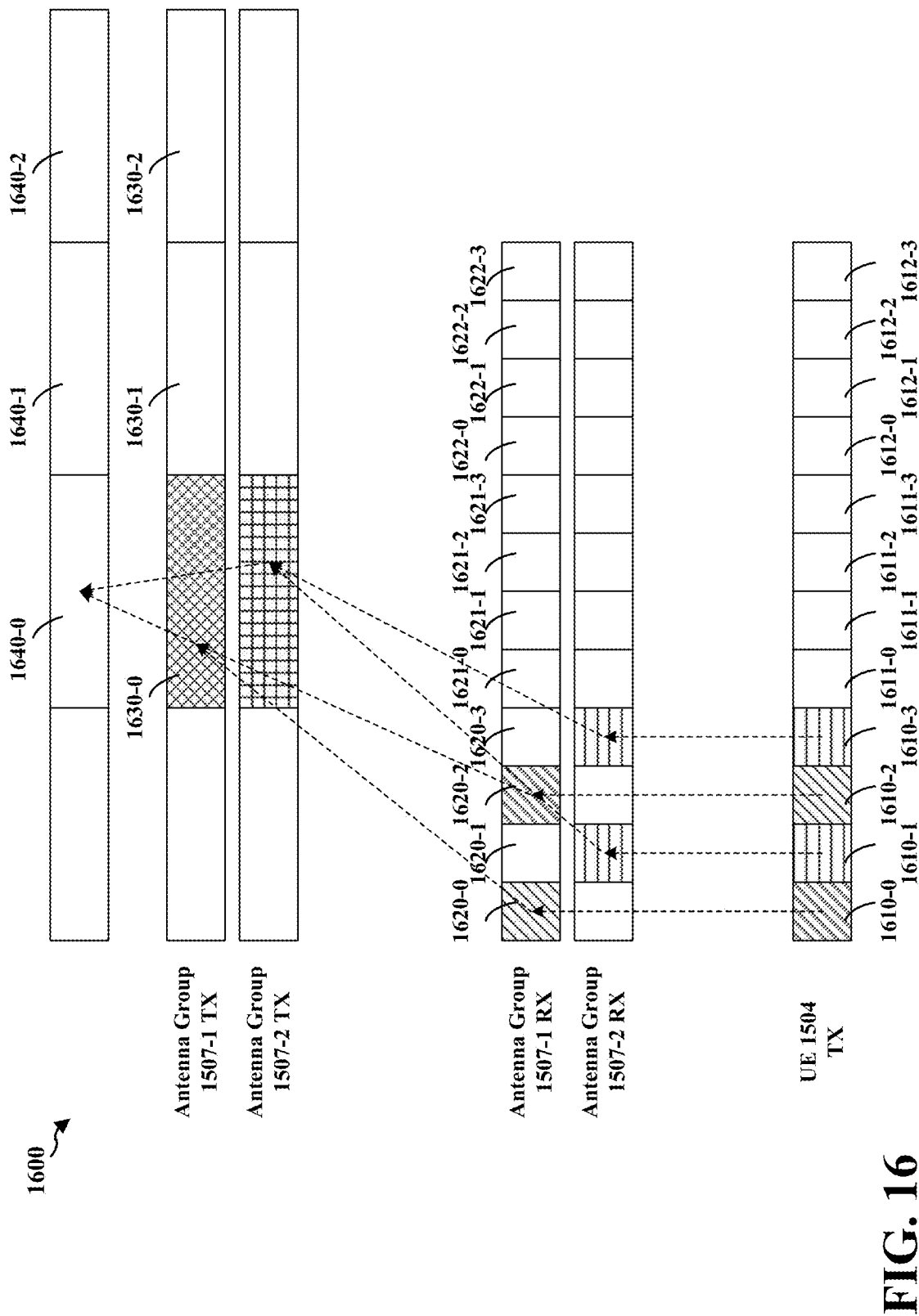
FIG. 16 is a diagram 1600 illustrating a second example of uplink transmission timing from a UE to a base station via one repeater.

FIG. 16 is a diagram 1600 illustrating a second example of uplink transmission timing from a UE to a base station via one repeater. The UE 1504 transmits, through the transmission antennas 1514-1, 1514-2, 1514-3 and 1514-4, RF signals on a first carrier frequency in slots 1610-0, ..., 1610-$q$, slots 1611-0, ..., 1611-$q$, and slots 1612-0, ..., 1612-$q$, etc. The slots 1610-0, ..., 1610-$q$, etc. are corresponding to a first subcarrier spacing (SCS$_1$, e.g., 120 kHz).

In this example, with M=8, $N_T$=4, and L=4. As a result, the 8 reception antennas at the repeater 1306 may be divided into $$G = \left\lfloor \frac{M}{N_T} \right\rfloor = 2$$

groups and each antenna group contains $N_g = N_T = 4$ antennas. Antennas in the g-th group combine the signal received in at most $L/G=2$ $TTI_1$ interval. For example, the UE 1504 may transmit the same data in the g-th and the (g+2)-th $TTI_1$ intervals. Accordingly, it can be determined that $w_{i,:} = e_g^T + e_{g+2}^T$. As such, W can be derived as follows:

$$w = \begin{bmatrix} w_{1,:} \\ \vdots \\ w_{8,:} \end{bmatrix} = \begin{bmatrix} 1 & 0 & 1 & 0 \\ 1 & 0 & 1 & 0 \\ 1 & 0 & 1 & 0 \\ 1 & 0 & 1 & 0 \\ 0 & 1 & 0 & 1 \\ 0 & 1 & 0 & 1 \\ 0 & 1 & 0 & 1 \\ 0 & 1 & 0 & 1 \end{bmatrix}$$

More specifically, on the n-th subcarrier, the first four reception antennas 1522-1 to 1522-4 (i=1 to 4, referred to as the antenna group 1507-1 RX) of the repeater 1506 receives the baseband signals $\tilde{b}_{1,1,n}$ through $\tilde{b}_{4,1,n}$, $\tilde{b}_{1,2,n}$ through $\tilde{b}_{4,2,n}$, $\tilde{b}_{1,3,n}$ through $\tilde{b}_{4,3,n}$ and $\tilde{b}_{1,4,n}$ through $\tilde{b}_{4,4,n}$ during four $TTI_1$ intervals (e.g., slots 1420-0 to 1420-3). The baseband signals $\tilde{b}_{1,1,n}$ through $\tilde{b}_{1,4,n}$ received during the first $TTI_1$ interval (e.g., slot 1420-0) and the baseband signals $\tilde{b}_{3,1,n}$ through $\tilde{b}_{3,4,n}$ received during the third $TTI_1$ interval (e.g., slot 1420-2) will be combined respectively and used to derive the baseband signals $b_{1,n}$ through $b_{4,n}$ to be transmitted at the transmission antennas 1524-1 to 1524-4, respectively. The baseband signals received at the antenna group 1507-1 RX during the second and the fourth $TTI_S$ intervals are ignored the antenna group 1507-1 RX. The transmission antennas 1524-1 to 1524-4 (i=1 to 4, referred to as the antenna group 1507-1 TX) of the repeater 1506 transmit the baseband signal $b_{1,n}$ through $b_{4,n}$ to the base station 1502 in the next $TTI_2$ interval (e.g., slot 1430-0).

The last four reception antennas 1522-5 to 1522-8 (i=5 to 8, referred to as the antenna group 1507-2 RX) of the repeater 1506 receives the baseband signals $\tilde{b}_{1,5,n}$ through $\tilde{b}_{4,5,n}$, $\tilde{b}_{1,6,n}$ through $\tilde{b}_{4,6,n}$, $\tilde{b}_{1,7,n}$ through $\tilde{b}_{4,7,n}$ and $\tilde{b}_{1,8,n}$ through $\tilde{b}_{4,8,n}$ during the four $TTI_1$ intervals (e.g., slots 1420-0 to 1420-3). The baseband signals $\tilde{b}_{2,5,n}$ through $\tilde{b}_{2,8,n}$ received during the second $TTI_1$ interval (e.g., slot 1420-1) and the baseband signals $\tilde{b}_{4,5,n}$ through $\tilde{b}_{4,8,n}$ received during the forth $TTI_1$ interval (e.g., slot 1420-3) will be combined respectively and used to derive the baseband signal $b_{5,n}$ through $b_{8,n}$. The baseband signals received during the first and third $TTI_1$ intervals are ignored by the antenna group 1507-2 RX. The transmission antenna 1524-5 to 1524-8 (i=5 to 8, referred to as the antenna group 1507-2 TX) of the repeater 1506 transmits the baseband signal $b_{5,n}$ through $b_{8,n}$ to the base station 1502 in the next TTI$_2$ interval (e.g., slot 1430-0).

For example, $b_{1,n}$ can be derived as follows $$b_{1,n} = [1\ 0\ 1\ 0] \begin{bmatrix} \tilde{b}_{1,1,n} \\ \tilde{b}_{2,1,n} \\ \tilde{b}_{3,1,n} \\ \tilde{b}_{4,1,n} \end{bmatrix} = \tilde{b}_{1,1,n} + \tilde{b}_{3,1,n}.$$

Similarly, $b_{2,n}$ to $b_{8,n}$ can be determined as follows:

$b_{2,n} = \tilde{b}_{1,2,n} + \tilde{b}_{3,2,n}$,
$b_{3,n} = \tilde{b}_{1,3,n} + \tilde{b}_{3,3,n}$,
$b_{4,n} = \tilde{b}_{1,4,n} + \tilde{b}_{3,4,n}$,
$b_{5,n} = \tilde{b}_{2,5,n} + \tilde{b}_{4,5,n}$,
$b_{6,n} = \tilde{b}_{2,6,n} + \tilde{b}_{4,6,n}$,
$b_{7,n} = \tilde{b}_{2,7,n} + \tilde{b}_{4,7,n}$,
$b_{8,n} = \tilde{b}_{2,8,n} + \tilde{b}_{4,8,n}$.

The base station 1502 receives the RF signals transmitted by the repeater 1506 on $f_2$ at its reception antennas 1510-1 through 1510-8. The received RF signals carry baseband signals $b_{i,n}$ transmitted by the repeater's transmission antennas during the TTI$_2$ interval. The base station 1502 first extracts the baseband signals $b_{i,n}$ (as received) from the received RF signals. Next, the base station 1502 processes the extracted baseband signals to recover the original baseband signals that were transmitted by the UE on $f_1$.

Figure 17:
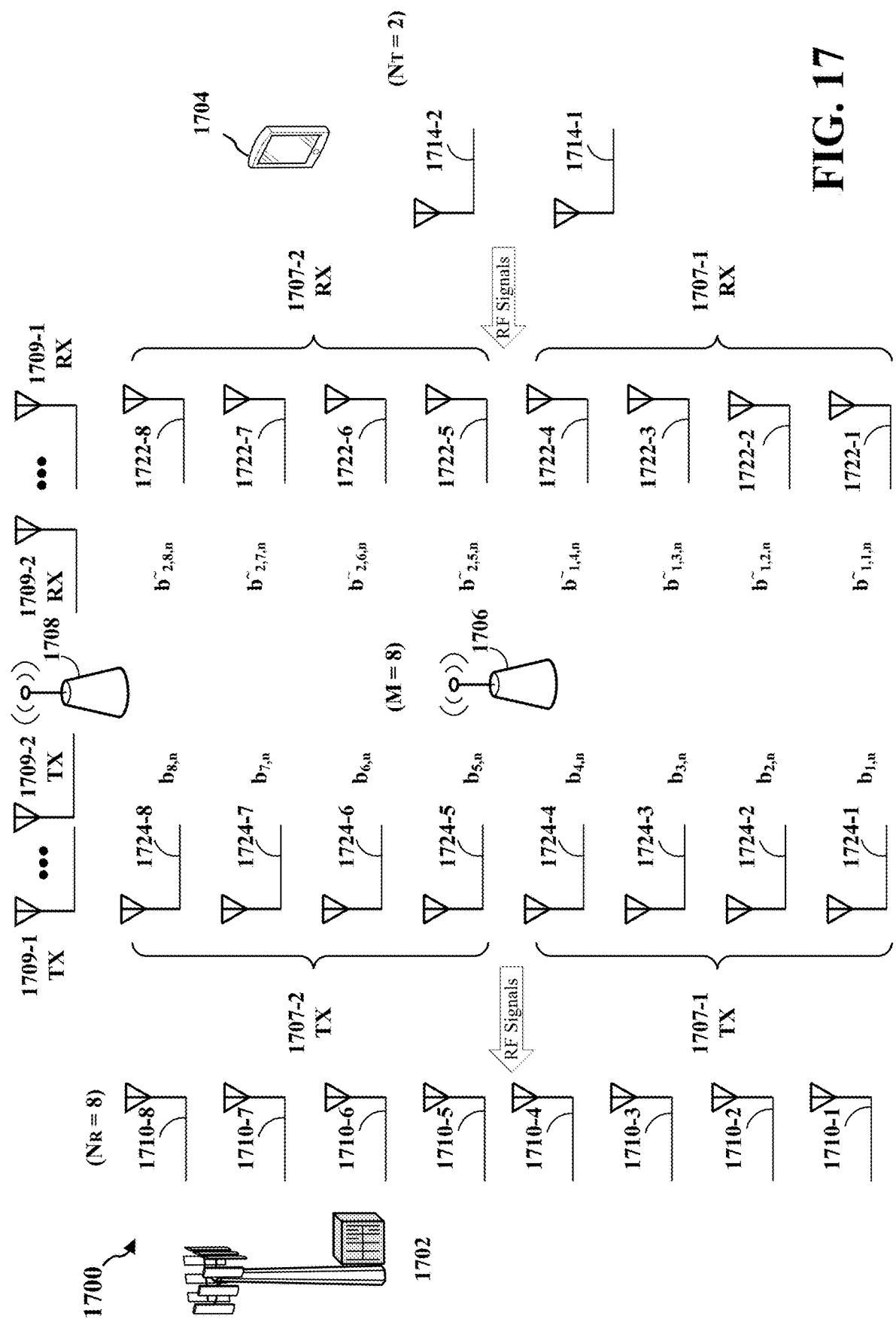
FIG. 17 is a diagram 1700 illustrating uplink MIMO transmission from a UE to a base station via more than one repeater.

FIG. 17 is a diagram 1700 illustrating uplink MIMO transmission from a UE to a base station via more than one repeater. In this example, a base station 1702 has 8 antennas 1710-1, 1710-2, . . . 1710-8, and a UE 1704 has 2 transmission antennas 1714-1 and 1714-2. Further, repeaters 1706 and 1708 are placed between the base station 1702 and the UE 1704. Each of the repeaters 1706 and 1708 has 8 reception antennas 1722-1, 1722-2, . . . , 1722-8 and 8 transmission antennas 1724-1, 1724-2, . . . , 1724-8. In certain configurations, the same antenna may function as a reception antenna and a transmission antenna.

Figure 18:
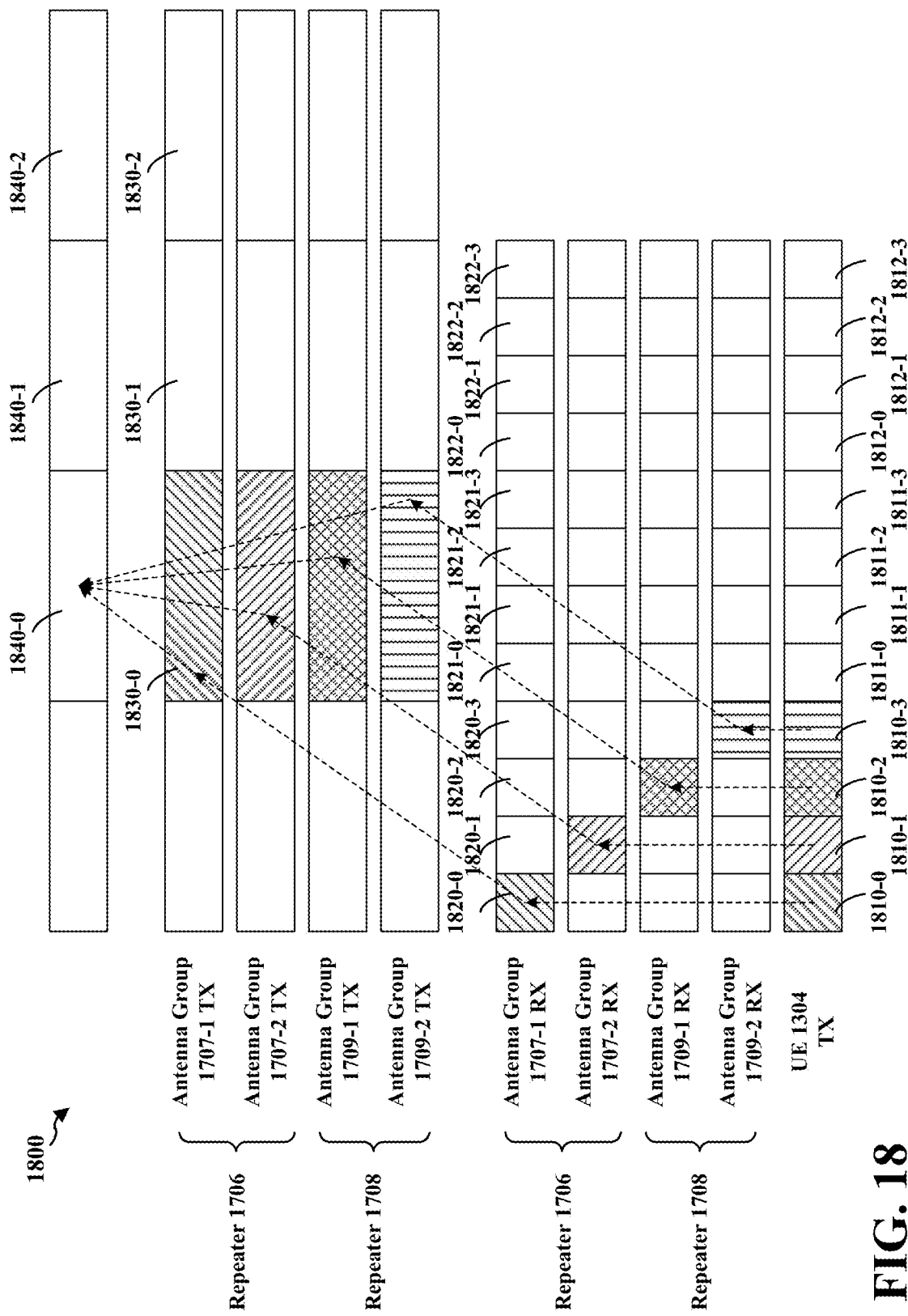
FIG. 18 is a diagram 1800 illustrating uplink transmission timing from a UE to a base station via more than one repeater.

FIG. 18 is a diagram 1800 illustrating uplink transmission timing from a UE to a base station via more than one repeater. The UE 1704 transmits, through the transmission antennas 1714-1 and 1714-2, RF signals on a first carrier frequency in slots 1810-0, . . . , 1810-q, slots 1811-0, . . . , 1811-q, and slots 1812-0, . . . , 1812-q, etc. The slots 1810-0, . . . , 1810-q, etc. are corresponding to a first subcarrier spacing (SCS$_1$, e.g., 120 kHz).

Since there are two repeaters 1706 and 1708, the 4 TTI$_1$ intervals are divided into two groups, $\mathcal{L}_1 = \{1,2\}$ (e.g., slots 1820-0 and 1820-1) and $\mathcal{L}_2 = \{3,4\}$ (e.g., slots 1820-2 and 1820-3), where signal for TTI$_1$ intervals of $\mathcal{L}_1$ is directed to the repeater 1306 and signal for TTI$_1$ intervals of $\mathcal{L}_2$ is directed to the repeater 1308. As only two TTI$_1$ intervals of every L=4 TTI$_1$ intervals are allocated to each repeater, the antennas at each repeater are partitioned into two groups and each group contains $N_g = M/2 = 4$ antennas handling the signal received in the corresponding TTI intervals.

In this example, the first 2 TTI$_1$ intervals (e.g., slots 1820-0 and 1820-1) are allocated to the repeater 1706 and the next 2 TTI$_1$ intervals (e.g., slots 1820-2 and 1820-3) are allocated to the repeater 1708. Then the techniques described supra can be applied to each repeater in each TTI$_1$ group. More specifically, on the n-th subcarrier, the first four reception antennas 1722-1 to 1722-4 (i=1 to 4, referred to as the antenna group 1707-1 RX) of the repeater 1706 receives baseband signals $\tilde{b}_{1,1,n}^{(a)}$ and $\tilde{b}_{2,1,n}^{(a)}$, $\tilde{b}_{2,1,n}^{(a)}$ and $\tilde{b}_{2,2,n}^{(a)}$, $\tilde{b}_{1,3,n}^{(a)}$ and $\tilde{b}_{2,3,n}^{(a)}$, and $\tilde{b}_{1,4,n}^{(a)}$ and $\tilde{b}_{2,4,n}^{(a)}$ in the initial two TTI$_1$ intervals (e.g., slots 1820-0 and 1820-1). Any signals $\tilde{b}_{l,i,n}^{(a)}$ (l=3,4; i=1,2,3,4) received in the subsequent two TTI$_1$ intervals are ignored.

The baseband signals $\tilde{b}_{1,1,n}^{(a)}$ through $\tilde{b}_{1,4,n}^{(a)}$ received during the first TTI$_1$ interval (e.g., slot 1820-0) are used to derive the baseband signal $b_{1,n}^{(2)}$ through $b_{4,n}^{(a)}$. The baseband signals received during the second TTI$_1$ intervals are ignored. The transmission antennas 1724-1 to 1724-4 (i=1 to 4, referred to as the antenna group 1707-1 TX) of the repeater 1706 transmit the baseband signals $b_{1,n}^{(a)}$ through $b_{4,n}^{(a)}$ to the base station 1702 in the next TTI$_2$ interval (e.g., slot 1830-0).

The last four reception antennas 1722-5 to 1722-8 (i=5 to 8, referred to as the antenna group 1707-2 RX) of the repeater 1706 receive baseband signals $\tilde{b}_{1,5,n}^{(a)}$ and $\tilde{b}_{2,5,n}^{(a)}$, $\tilde{b}_{1,5,n}^{(a)}$ and $\tilde{b}_{2,5,n}^{(a)}$, $\tilde{b}_{1,7,n}^{(a)}$ and $\tilde{b}_{2,7,n}^{(a)}$ and $\tilde{b}_{1,8,n}^{(a)}$ and $\tilde{b}_{2,8,n}^{(a)}$ the initial two TTI$_1$ intervals (e.g., slots 1820-0 and 1820-1). Any signals $\tilde{b}_{l,i,n}^{(a)}$ (l=3,4; i=1,2,3,4) in the subsequent two TTI$_1$ intervals are ignored.

The baseband signals $\tilde{b}_{2,5,n}^{(a)}$ through $\tilde{b}_{2,8,n}^{(a)}$ received during the second TTI$_1$ interval (e.g., slot 1820-1) are used to derive the baseband signal $b_{5,n}^{(a)}$ through $b_{8,n}^{(a)}$. The baseband signals received during the first TTI$_1$ intervals are ignored. The transmission antennas 1724-5 to 1724-8 (i=5 to 8, referred to as the antenna group 1707-2 TX) of the repeater 1706 transmit the baseband signal $b_{5,n}^{(a)}$ through $b_{8,n}^{(a)}$ to the base station 1702 in the next TTI$_2$ interval (e.g., slot 1830-0).

Accordingly, the coefficients of the linear combination for the repeater 1706 can be expressed as $$W^{(a)} = \begin{bmatrix} 1 & 0 & 0 & 0 \\ 1 & 0 & 0 & 0 \\ 1 & 0 & 0 & 0 \\ 1 & 0 & 0 & 0 \\ 0 & 1 & 0 & 0 \\ 0 & 1 & 0 & 0 \\ 0 & 1 & 0 & 0 \\ 0 & 1 & 0 & 0 \end{bmatrix}$$

$$b_{1,n}^{(a)} = [1\ 0\ 0\ 0] \begin{bmatrix} \tilde{b}_{1,1,n}^{(a)} \\ \tilde{b}_{2,1,n}^{(a)} \\ \tilde{b}_{3,1,n}^{(a)} \\ \tilde{b}_{4,1,n}^{(a)} \end{bmatrix} = \tilde{b}_{1,1,n}^{(a)}.$$

Similarly, the below baseband signals to be transmitted at the repeater 1706 can be determined:

$b_{2,n}^{(a)} = \tilde{b}_{1,2,n}^{(a)}$,
$b_{3,n}^{(a)} = \tilde{b}_{1,3,n}^{(a)}$,
$b_{4,n}^{(a)} = \tilde{b}_{1,4,n}^{(a)}$,
$b_{5,n}^{(a)} = \tilde{b}_{2,5,n}^{(a)}$,
$b_{6,n}^{(a)} = \tilde{b}_{2,6,n}^{(a)}$,
$b_{7,n}^{(a)} = \tilde{b}_{2,7,n}^{(a)}$,
$b_{8,n}^{(a)} = \tilde{b}_{2,8,n}^{(a)}$.

As described supra, the next 2 TTI$_1$ intervals (e.g., slots 1820-2 and 1820-3) are allocated to the repeater 1708. The reception antennas of the repeater 1708 are divided into reception antenna groups 1709-1 RX and 1709-2 RX. The transmission antennas of the repeater 1708 are divided into transmission antenna groups 1709-1 TX and 1709-2 TX. Accordingly, the repeater 1708 receives signals $\tilde{b}_{l,i,n}^{(b)}$=3,4; i=1 to 8) in the third and fourth TTI$_1$ intervals and ignores signals $\tilde{b}_{l,i,n}^{(b)}$=1,2; i=1 to 8) received in the initial 2 TTI$_1$ intervals. The coefficients of the linear combination for the repeater 1708 can be expressed as $$W^{(b)} = \begin{bmatrix} 0 & 0 & 1 & 0 \\ 0 & 0 & 1 & 0 \\ 0 & 0 & 1 & 0 \\ 0 & 0 & 1 & 0 \\ 0 & 0 & 0 & 1 \\ 0 & 0 & 0 & 1 \\ 0 & 0 & 0 & 1 \\ 0 & 0 & 0 & 1 \end{bmatrix}$$

The baseband signals to be transmitted at the antennas of the repeater 1708 are as follows:

$$b_{1,n}^{(b)} = [0\ 0\ 1\ 0] \begin{bmatrix} \tilde{b}_{1,1,n}^{(b)} \\ \tilde{b}_{2,1,n}^{(b)} \\ \tilde{b}_{3,1,n}^{(b)} \\ \tilde{b}_{4,1,n}^{(b)} \end{bmatrix} = \tilde{b}_{3,1,n}^{(b)},$$

$$b_{2,n}^{(b)} = \tilde{b}_{3,2,n}^{(b)},$$
$$b_{3,n}^{(b)} = \tilde{b}_{3,3,n}^{(b)},$$
$$b_{4,n}^{(b)} = \tilde{b}_{3,4,n}^{(b)},$$
$$b_{5,n}^{(b)} = \tilde{b}_{4,5,n}^{(b)},$$
$$b_{6,n}^{(b)} = \tilde{b}_{4,6,n}^{(b)},$$
$$b_{7,n}^{(b)} = \tilde{b}_{4,7,n}^{(b)},$$
$$b_{8,n}^{(b)} = \tilde{b}_{4,8,n}^{(b)},$$

In the design above, the base station 1702 needs to know how the UE 1704 maps data signal to the transmitting analog signal, and how repeaters map their Rx signal in the first frequency to the Tx signal in the second frequency, so that the base station 1702 can recover the data signal from its received signal sent by the repeaters 1706 and 1708.

In general, for an UL MIMO system assisted with K repeaters, the proposed architecture can transmit at most min{$LN_T$, KM, $N_R$} spatial layers from the UE to the base station for every TTI in the second frequency, i.e., R≤min{$LN_T$, KM, $N_R$}. Each TTI in the first frequency may be associated with one of the K repeaters, so that the UE transmits signal targeting to only one repeater in each TTI in the first frequency. In this setting, the L TTIs in the first frequency are partitioned into K groups where each group $\mathcal{L}_k$ is $N_k$ TTIs in the first frequency to be used by the k-th repeater. Then the case can be applied with only one repeater to each group $\mathcal{L}_k$ associated with the k-th RCFT repeater (k=1, . . . , K).

Figure 19:
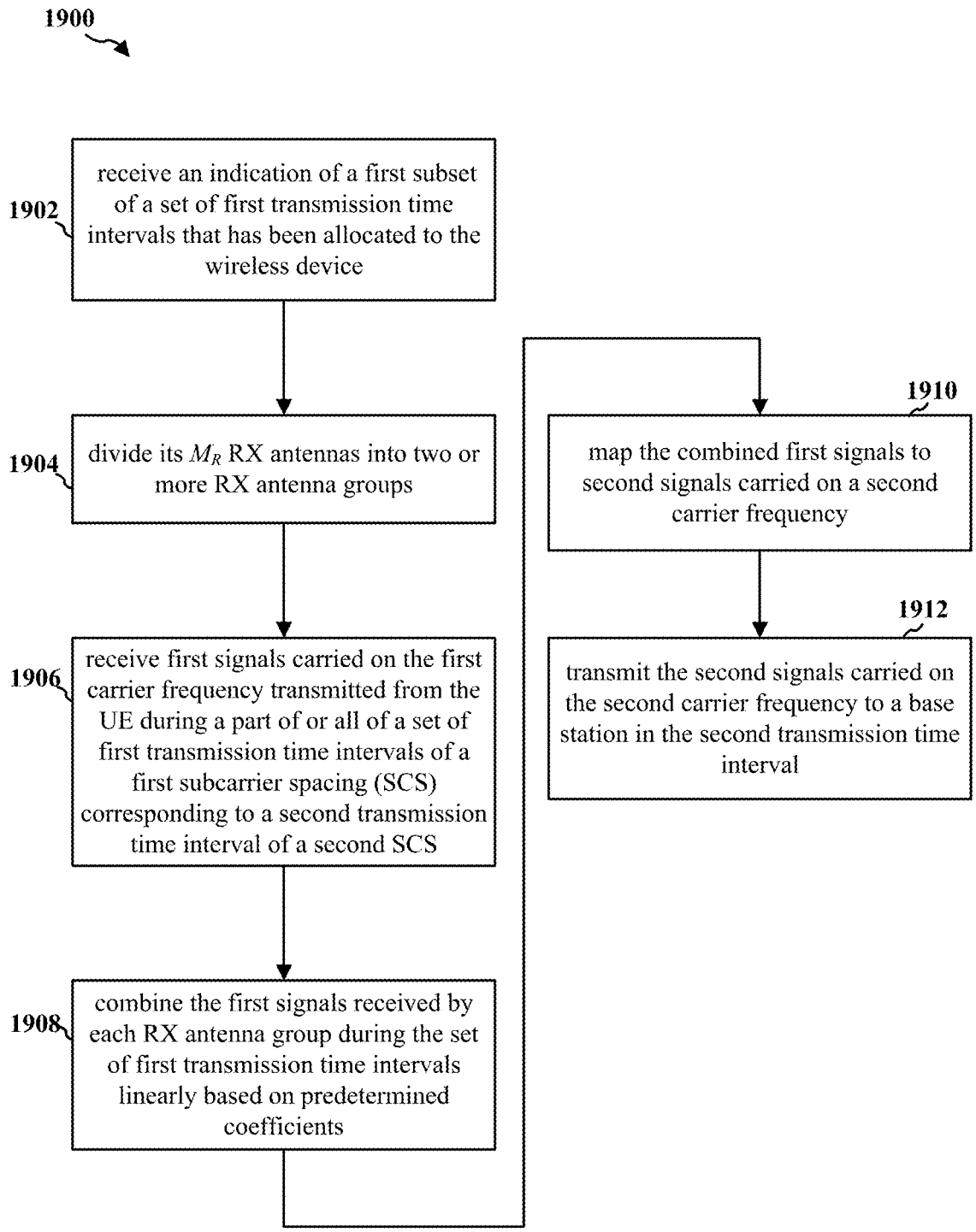
FIG. 19 is a flow chart of a method (process) for forwarding uplink data.

FIG. 19 is a flow chart 1900 of a method (process) forwarding uplink data. The method may be performed by a wireless device (e.g., the repeater 1306, 1506, 1706, or 1708). In operation 1902, the wireless device receives an indication of a first subset of a set of first transmission time intervals that has been allocated to the wireless device. In certain configurations, the first subset of the set of first transmission time intervals is allocated to the wireless device, and a second subset of the set of first transmission time intervals is allocated to another wireless device. The first subset and the second subset may be disjoint and may be determined based on a predefined partitioning scheme, such that each wireless device is allocated a unique subset of the set of first transmission time intervals for receiving and combining first signals.

In operation 1904, the wireless device divides its $M_R$ reception (RX) antennas into two or more RX antenna groups for receiving signals transmitted from a user equipment (UE) on a first carrier frequency. The number of transmission antennas of the UE is represented by $N_T$, and the number of reception antennas in each RX antenna group is greater than or equal to $N_T$. $M_T$, $M_R$, and $N_T$ are positive integers.

During operation 1906, each RX antenna group receives first signals carried on the first carrier frequency transmitted from the UE during a part of or all of a set of first transmission time intervals of a first subcarrier spacing (SCS) corresponding to a second transmission time interval of a second SCS.

In operation 1908, the wireless device combines the first signals received by each RX antenna group during the set of first transmission time intervals linearly based on predetermined coefficients. In certain configurations, the predetermined coefficients provide a linear combination of the first signals received during the set of first transmission time intervals for each RX antenna group, and each of the predetermined coefficients corresponds to each of the first transmission time intervals. In certain configurations, the predetermined coefficients provide that, for each RX antenna group, first signals received during one or more intervals of the first subset of the set of first transmission time intervals are included in the combined first signals without further combining with first signals received during the second subset of the set of first transmission time intervals. In certain configurations, the first signals received in two or more intervals of the set of first transmission time intervals carry the same data from the UE.

Next, in operation 1910, the wireless device maps the combined first signals to second signals carried on a second carrier frequency.

Finally, in operation 1912, the wireless device transmits the second signals carried on the second carrier frequency to a base station in the second transmission time interval at a respective transmission antenna group selected from the $M_T$ transmission (TX) antennas of the wireless device and corresponding to each RX antenna group. In certain configurations, the respective transmission antenna group is selected from the $M_T$ TX antennas for each RX antenna group such that any two transmission antenna groups contain no common transmission antennas.

The first signals carry R spatial layers of data. R is a positive integer and greater than or equal to $N_T$. The first carrier frequency and the second carrier frequency are different. The first transmission time interval corresponds to a first subcarrier spacing, and the second transmission time interval corresponds to a second subcarrier spacing, with the first subcarrier spacing being greater than the second subcarrier spacing.

Figure 20:
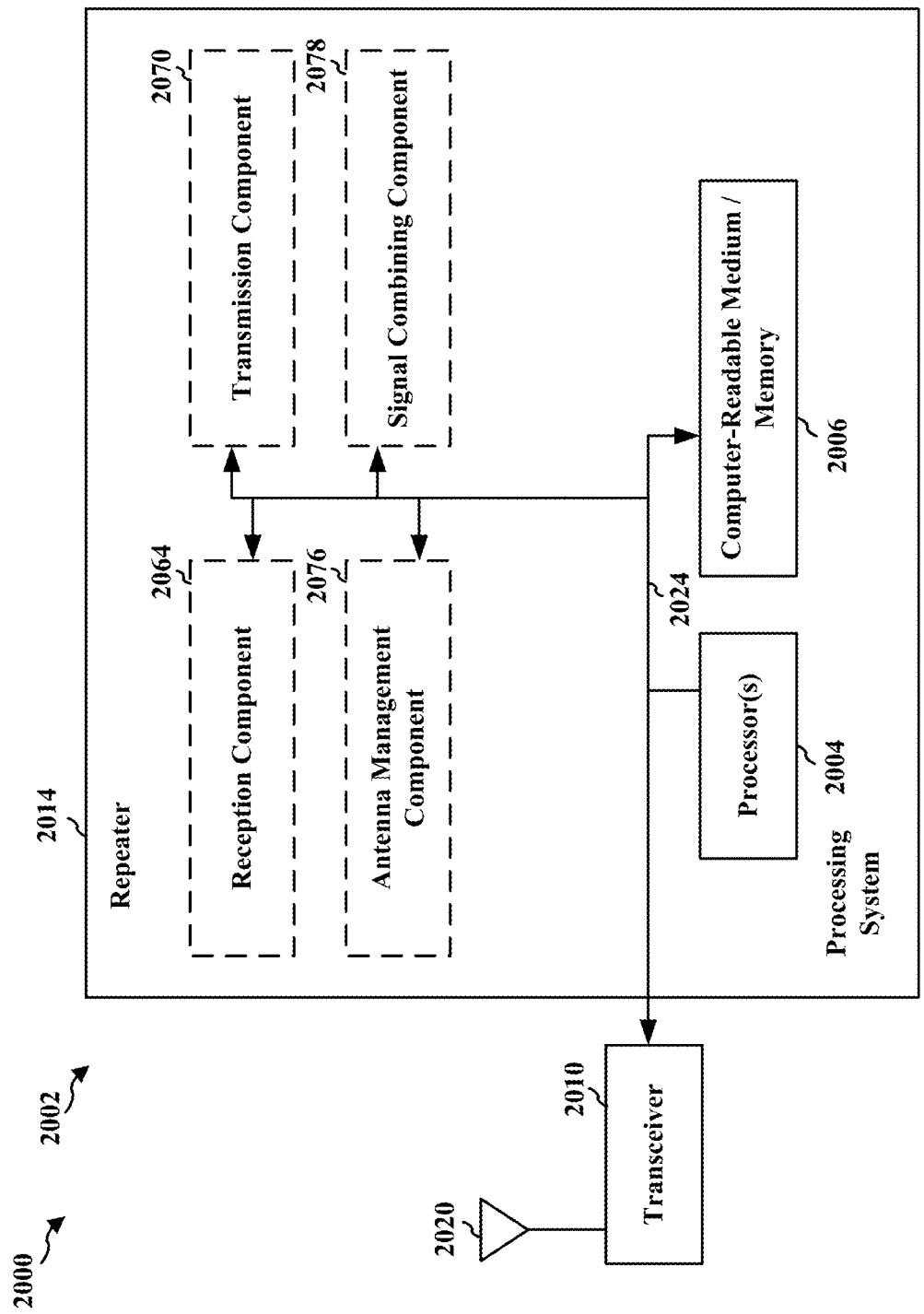
FIG. 20 is a diagram illustrating an example of a hardware implementation for an apparatus employing a processing system.

FIG. 20 is a diagram 2000 illustrating an example of a hardware implementation for an apparatus 2002 employing a processing system 2014. The apparatus 2002 may be a wireless device (e.g., the repeater 1306, 1506, 1706, or 1708). The processing system 2014 may be implemented with a bus architecture, represented generally by a bus 2024. The bus 2024 may include any number of interconnecting buses and bridges depending on the specific application of the processing system 2014 and the overall design constraints. The bus 2024 links together various circuits including one or more processors and/or hardware components, represented by one or more processors 2004, a reception component 2064, a transmission component 2070, an antenna management component 2076, a signal combining component 2078, and a computer-readable medium/memory 2006. The bus 2024 may also link various other circuits such as timing sources, peripherals, voltage regulators, and power management circuits, etc.

The processing system 2014 may be coupled to a transceiver 2010, which may be one or more of the transceivers 354. The transceiver 2010 is coupled to one or more antennas 2020, which may be the communication antennas 352.

The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 2064. In addition, the transceiver 2010 receives information from the processing system 2014, specifically the transmission component 2070, and based on the received information, generates a signal to be applied to the one or more antennas 2020.

The processing system 2014 includes one or more processors 2004 coupled to a computer-readable medium/ memory 2006. The one or more processors 2004 are responsible for general processing, including the execution of software stored on the computer-readable medium/memory 2006. The software, when executed by the one or more processors 2004, causes the processing system 2014 to perform the various functions described supra for any particular apparatus. The computer-readable medium/memory 2006 may also be used for storing data that is manipulated by the one or more processors 2004 when executing software. The processing system 2014 further includes at least one of the reception component 2064, the transmission component 2070, the antenna management component 2076, and the signal combining component 2078. The components may be software components running in the one or more processors 2004, resident/stored in the computer readable medium/memory 2006, one or more hardware components coupled to the one or more processors 2004, or some combination thereof. The processing system 2014 may be a component of the UE 350 and may include the memory 360 and/or at least one of the TX processor 368, the RX processor 356, and the communication processor 359.

In one configuration, the apparatus 2002 for wireless communication includes means for performing each of the operations of FIG. 19. The aforementioned means may be one or more of the aforementioned components of the apparatus 2002 and/or the processing system 2014 of the apparatus 2002 configured to perform the functions recited by the aforementioned means.

As described supra, the processing system 2014 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a wireless device equipped with $M_R$ reception (RX) antennas and $M_T$ transmission (TX) antennas, comprising:

dividing the $M_R$ RX antennas of the wireless device into two or more RX antenna groups for receiving signals transmitted from a user equipment (UE) on a first carrier frequency, wherein the UE comprises $N_T$ transmission antennas, and wherein a number of reception antennas in each RX antenna group is greater than or equal to $N_T$, wherein $M_T$, $M_R$ and $N_T$ are positive integers;

receiving, at each RX antenna group, first signals carried on the first carrier frequency transmitted from the UE during a part of or all of a set of first transmission time intervals of a first subcarrier spacing (SCS) corresponding to a second transmission time interval of a second SCS;

combining, linearly based on predetermined coefficients, the first signals received by each RX antenna group during the set of first transmission time intervals;

mapping the combined first signals to second signals carried on a second carrier frequency; and transmitting, at a respective transmission antenna group selected from the $M_T$ TX antennas of the wireless device and corresponding to each RX antenna group, the second signals carried on the second carrier frequency to a base station in the second transmission time interval.

2. The method of claim 1, wherein the first signals carry R spatial layers of data, R being a positive integer and greater than or equal to $N_T$.

3. The method of claim 1, wherein the respective transmission antenna group is selected from the $M_T$ TX antennas for each RX antenna group such that any two transmission antenna groups contain no common transmission antennas.

4. The method of claim 1, wherein the predetermined coefficients provide a linear combination of the first signals received during the set of first transmission time intervals for each RX antenna group, and each of the predetermined coefficients corresponds to each of the first transmission time intervals.

5. The method of claim 1, wherein the predetermined coefficients provide that, for each RX antenna group, first signals received in one interval of the set of first transmission time intervals are included in the combined first signals without further combining with first signals received in any other intervals of the set of first transmission time intervals.

6. The method of claim 1, wherein the first signals received in two or more intervals of the set of first transmission time intervals carry the same data from the UE.

7. The method of claim 1, wherein the first carrier frequency and the second carrier frequency are different.

8. The method of claim 1, wherein the first transmission time interval corresponds to a first subcarrier spacing and the second transmission time interval corresponds to a second subcarrier spacing, the first subcarrier spacing being greater than the second subcarrier spacing.

9. The method of claim 1, wherein a first subset of the set of first transmission time intervals is allocated to the wireless device and a second subset of the set of first transmission time intervals is allocated to another wireless device, wherein the first subset and the second subset are disjoint; wherein the predetermined coefficients provide that, for each RX antenna group, first signals received during one or more intervals of the first subset of the set of first transmission time intervals are included in the combined first signals without further combining with first signals received during the second subset of the set of first transmission time intervals.

10. The method of claim 9, further comprising:
receiving, from the base station, an indication of the first subset that has been allocated to the wireless device.

11. The method of claim 9, wherein the first subset and the second subset of the set of first transmission time intervals are determined based on a predefined partitioning scheme, such that each wireless device is allocated a unique subset of the set of first transmission time intervals for receiving and combining first signals.

12. A wireless device, comprising: $M_R$ reception (RX) antennas; $M_T$ transmission (TX) antennas; a memory; and at least one processor coupled to the memory and configured to:
divide the $M_R$ RX antennas of the wireless device into two or more RX antenna groups for receiving signals transmitted from a user equipment (UE) on a first carrier frequency, wherein the UE comprises $N_T$ transmission antennas, and wherein a number of reception antennas in each RX antenna group is greater than or equal to $N_T$, wherein $M_T$, $M_R$ and $N_T$ are positive integers;

receive, at each RX antenna group, first signals carried on the first carrier frequency transmitted from the UE during a part of or all of a set of first transmission time intervals of a first subcarrier spacing (SCS) corresponding to a second transmission time interval of a second SCS;

combine, linearly based on predetermined coefficients, the first signals received by each RX antenna group during the set of first transmission time intervals;

map the combined first signals to second signals carried on a second carrier frequency; and transmit, at a respective transmission antenna group selected from the $M_T$ TX antennas of the wireless device and corresponding to each RX antenna group, the second signals carried on the second carrier frequency to a base station in the second transmission time interval.

13. The wireless device of claim 12, wherein the first signals carry R spatial layers of data, R being a positive integer and greater than or equal to $N_T$.

14. The wireless device of claim 12, wherein the respective transmission antenna group is selected from the $M_T$ TX antennas for each RX antenna group such that any two transmission antenna groups contain no common transmission antennas.

15. The wireless device of claim 12, wherein the predetermined coefficients provide a linear combination of the first signals received during the set of first transmission time intervals for each RX antenna group, and each of the predetermined coefficients corresponds to each of the first transmission time intervals.

16. The wireless device of claim 12, wherein the predetermined coefficients provide that, for each RX antenna group, first signals received in one interval of the set of first transmission time intervals are included in the combined first signals without further combining with first signals received in any other intervals of the set of first transmission time intervals.

17. The wireless device of claim 12, wherein the first signals received in two or more intervals of the set of first transmission time intervals carry the same data from the UE.

18. The wireless device of claim 12, wherein the first carrier frequency and the second carrier frequency are different.

19. The wireless device of claim 12, wherein the first transmission time interval corresponds to a first subcarrier spacing and the second transmission time interval corresponds to a second subcarrier spacing, the first subcarrier spacing being greater than the second subcarrier spacing.

20. The wireless device of claim 12, wherein a first subset of the set of first transmission time intervals is allocated to the wireless device and a second subset of the set of first transmission time intervals is allocated to another wireless device, wherein the first subset and the second subset are disjoint; wherein the predetermined coefficients provide that, for each RX antenna group, first signals received during one or more intervals of the first subset of the set of first transmission time intervals are included in the combined first signals without further combining with first signals received during the second subset of the set of first transmission time intervals.

* * * * *